(12) United States Patent
Lin et al.

(10) Patent No.: US 11,796,826 B2
(45) Date of Patent: Oct. 24, 2023

(54) LENS DEVICE

(71) Applicants: Sintai Optical (Shenzhen) Co., Ltd., Guandong (CN); Asia Optical Co., Inc., Taichung (TW)

(72) Inventors: Guo-Quan Lin, ShenZhen (CN); Pin-Tzu Lien, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 109 days.

(21) Appl. No.: 17/392,475

(22) Filed: Aug. 3, 2021

(65) Prior Publication Data

US 2022/0066224 A1  Mar. 3, 2022

(30) Foreign Application Priority Data

Aug. 26, 2020 (CN) .......................... 202010871514.X

(51) Int. Cl.
| | |
|---|---|
| *G02B 27/10* | (2006.01) |
| *G02B 7/02* | (2021.01) |
| *G02B 13/00* | (2006.01) |
| *G02B 5/04* | (2006.01) |
| *H04N 25/40* | (2023.01) |

(52) U.S. Cl.
CPC ............ *G02B 27/1013* (2013.01); *G02B 5/04* (2013.01); *G02B 7/02* (2013.01); *G02B 13/0065* (2013.01); *H04N 25/41* (2023.01)

(58) Field of Classification Search
CPC ............ G02B 13/0065; G02B 27/1013; G02B 27/646; G02B 5/04; G02B 7/02; G02B 7/021; G02B 7/09; G02B 7/1805; H04N 23/16; H04N 25/41

See application file for complete search history.

(56) References Cited

U.S. PATENT DOCUMENTS

| 2018/0094976 A1* | 4/2018 | Lee ........................ G01J 3/2803 |
| 2020/0045211 A1* | 2/2020 | Liu ........................ G02B 15/177 |
| 2021/0048605 A1* | 2/2021 | Lim .................... G02B 13/0065 |
| 2021/0137369 A1* | 5/2021 | Meester ................ A61B 5/0071 |
| 2021/0368080 A1* | 11/2021 | Bachar ...................... G01J 3/36 |

* cited by examiner

*Primary Examiner* — Amy R Hsu
(74) *Attorney, Agent, or Firm* — McClure, Qualey & Rodack, LLP

(57) ABSTRACT

A lens device includes a lens module, a light splitting module and an image sensing module. The lens module includes an optical axis extended in a first direction. The light splitting module is configured to split light coming from the lens module into at least a first light beam and a second light beam, wherein the first light beam and the second light beam have wavelengths of different ranges. The image sensing module includes a plurality of image sensing units corresponding to the first light beam and the second light beam respectively, wherein the image sensing units are disposed at different sides of the light splitting module to sense the corresponding light beam.

20 Claims, 11 Drawing Sheets

LENS DEVICE

BACKGROUND OF THE INVENTION

Field of the Invention

The invention relates to optics, and more particularly to a lens device.

Description of the Related Art

FIG. 1 depicts a known lens device, wherein the lens device 1 includes a prism module 11 for changing the travel direction of a light beam from a second direction Y to a first direction X by reflection, a lens module 12 provided with an optical axis extending in the first direction X, and an image sensor 13. The lens module 12 may be, for example, a telescope lens module. The greater the magnification of the long focal length of a telescope lens module, the greater the effective focal length. Under the limitation of the thickness of the lens device 1, the aperture will become smaller if the effective area for the incident beam is fixed and the effective focal length of the lens module 12 is increased in multiples. As a result, the light reaching the image sensor 13 is too dark to be acceptable and that is significantly disadvantageous to image forming.

BRIEF SUMMARY OF THE INVENTION

The invention provides a lens device to address the above problems. The quality of images of the invention is good even when the focal length and magnification of the long focal length of the lens module are large.

The lens device in accordance with an exemplary embodiment of the invention includes a lens module, a light splitting module and an image sensing module. The lens module includes an optical axis extended in a first direction. The fight splitting module is configured to split light coming from the lens module into a first light beam and a second light beam, wherein the first light beam and the second light beam have wavelengths of different ranges. The image sensing module includes a plurality of image sensing units corresponding to the first light beam and the second light beam respectively, wherein the image sensing units are disposed at different sides of the light splitting module to sense the corresponding light beam.

In another exemplary embodiment, the image sensing units includes a first-light-beam image sensing unit configured to sense the first light beam, and a second-light-beam image sensing unit configured to sense the second light beam.

In yet another exemplary embodiment, the light splitting module is configured to further split the light into a third light beam; the first light beam, the second light beam and the third light beam have wavelengths of different ranges; the image sensing modules further includes a third-light-beam image sensing unit to sense the third light beam; the light splitting module includes a first prism unit and a second prism unit disposed adjacent to the first prism unit; the first prism unit includes a first surface allowing the light that enters the first prism unit to pass therethrough, a second surface reflecting the first light beam and allowing the second and third light beams to pass therethrough, a first light splitting film coated on the second surface, and a third surface from which the first light beam exits; the second prism unit includes a fourth surface allowing the second and third light beams to pass therethrough, a fifth surface reflecting the second light beam and allowing the third light beam to pass therethrough, a second light splitting film coated on the fifth surface, and a sixth surface from which the second light beam exits; the fourth surface and the second surface are disposed to face each other.

In another exemplary embodiment, the light splitting module further includes a third prism unit disposed adjacent to the second prism unit; the third prism unit includes a seventh surface allowing the third light beam to pass therethrough, and an eighth surface from which the third light beam exits; the seventh surface is disposed adjacent to the fifth surface; the first light beam is reflected on the second surface to the first surface, is totally reflected on the first surface, and exits from the third surface; the first light splitting film coated on the second surface allows light of wavelength of 500 nm-700 nm to pass therethrough; the second light beam is reflected on the fifth surface to the fourth surface, is totally reflected on the fourth surface, and exits from the sixth surface; the second light splitting film coated on the fifth surface allows light of wavelength of 400 nm-600 nm to pass therethrough.

In yet another exemplary embodiment, the second prism unit is configured to turn the second light beam, the second-light-beam image sensing unit is configured to sense the second light beam and is disposed adjacent to the sixth surface, the second-light-beam image sensing unit and the first-light-beam image sensing unit are disposed at same side of the light splitting module, and the third-light-beam image sensing unit and the first-light-beam image sensing unit are disposed at different sides of the light splitting module.

In another exemplary embodiment, the image sensing units includes a first-light-beam image sensing unit configured to sense the first light beam, and a second-light-beam image sensing unit configured to sense the second light beam.

In yet another exemplary embodiment, the light splitting module includes a light incident surface through which the light enters the light splitting module, a light splitting surface allowing the first light beam to pass therethrough and reflecting the second light beam, a first exiting surface from which the first light beam exits, and a second exiting surface from which the second Tight beam exits; the image sensing module includes a first image sensing unit disposed adjacent to the first exiting surface, a second image sensing unit disposed adjacent to the second exiting surface, a first optical filter disposed between the first image sensing unit and the first exiting surface, and a second optical filter disposed between the second image sensing unit and the second exiting surface; the first optical filter allows light of wavelength of 400 nm-600 nm to pass therethrough; the second optical filter allows light of wavelength of 500 nm-700 nm to pass therethrough.

In another exemplary embodiment, the lens device further includes a reflecting module and a light-path turning module wherein the light travels in a second direction to enter the lens device, is reflected in the first direction to the lens module by the reflecting module, and the light-path turning module is disposed in a light path between the lens module and the light splitting module.

In yet another exemplary embodiment, the light-path turning module includes a first reflecting unit and a second reflecting unit movable along an axis in same direction or in opposite directions, the first reflecting unit includes a first reflecting surface to reflect the light exiting from the lens module to the second reflecting unit, the second reflecting unit includes a second reflecting surface to reflect the light exiting from the lens module to the light splitting module, and the axis is perpendicular to the first direction and the second direction.

In another exemplary embodiment, the light-path turning module includes a first reflecting unit, a reflecting prism unit and a second reflecting unit. The first reflecting unit is configured to reflect the light coming from the lens module. The reflecting prism unit is movable in a third direction to reflect the light coming from the first reflecting unit, wherein the third direction is perpendicular to the first and second directions. The second reflecting unit is configured to reflect the light coming from the reflecting prism unit. The reflecting prism unit includes a first-prism-unit surface and a second-prism-unit surface, the first-prism-unit surface is configured to reflect the light entering the reflecting prism unit to the second-prism-unit surface, and the second-prism-unit surface is configured to reflect the light coming from the first-prism-unit surface to the second reflecting unit.

In yet another exemplary embodiment, the light-path turning module includes a first reflecting unit, a second reflecting unit and a third reflecting unit; the first reflecting unit and the second reflecting unit are movable along an axis in same direction or in opposite directions; the axis is perpendicular to the first direction and the second direction; the first reflecting unit reflects the light exiting from the lens module to the second reflecting unit; the second reflecting unit reflects the light coming from the first reflecting unit to the third reflecting unit; the third reflecting unit reflects the light coming from the second reflecting unit to the light splitting module.

In another exemplary embodiment, the light-path turning module includes a first reflecting unit, a second reflecting unit, a reflecting prism unit and a third reflecting unit; the first reflecting unit and the second reflecting unit are movable along an axis in same direction or in opposite directions; the axis is perpendicular to the first direction and the second direction; the first reflecting unit reflects the light exiting from the lens module to the second reflecting unit; the second reflecting unit reflects the light corning from the first reflecting unit to the reflecting prism unit; the reflecting prism unit includes a first prism incident surface allowing the light to penetrate, a first prism reflecting surface reflects the light that penetrates the first prism incident surface, a second prism reflecting surface receiving and reflecting the light reflected on the first prism reflecting surface, and a first prism exiting surface; the third reflecting unit reflects the light exiting from the reflecting prism unit to the light splitting module; the third reflecting unit is disposed in the light path, after the reflecting prism unit and before the light splitting module.

In yet another exemplary embodiment, the light-path turning module includes a first reflecting prism unit and a second reflecting prism unit; the first reflecting prism unit is movable in a third direction; the second reflecting prism unit is also movable in the third direction; the third direction is perpendicular to the first direction and the second direction; the first reflecting prism unit includes a first prism incident surface allowing the light to penetrate, a first prism reflecting surface reflects the light that penetrates the first prism incident surface, a second prism reflecting surface receiving and reflecting the light that is reflected on the first prism reflecting surface, and a first prism exiting surface; the second reflecting prism unit includes a second prism incident surface receiving the light that comes from the first reflecting prism unit, a third prism reflecting surface reflects the light, a fourth prism reflecting surface receiving and reflecting the light that is reflected on the third prism reflecting surface, and a second prism exiting surface disposed adjacent to the light splitting module.

In another exemplary embodiment, the light-path turning module includes a first reflecting unit, a second reflecting unit, a third reflecting unit and a fourth reflecting unit; the first reflecting unit includes a first front reflecting surface and a first rear reflecting surface wherein the first front reflecting surface and the first rear reflecting surface are opposite surfaces of the first reflecting unit, and the first front reflecting surface is configured to reflect the light exiting from the lens module to the second reflecting unit; the second reflecting unit is configured to reflect the light coining from the first reflecting surface to the third reflecting unit; the third reflecting unit is configured to reflect the light coming from the second reflecting unit to the fourth reflecting unit; the fourth reflecting unit is configured to reflect the light coming from the third reflecting unit to the first rear reflecting surface; the first rear reflecting surface is configured to reflect the light to the light splitting module.

In yet another exemplary embodiment, the light-path turning module includes a first reflecting prism unit, a second reflecting prism unit and a first reflecting unit; the first reflecting prism unit includes a first surface, a second surface and a third surface; the light coming from the lens module penetrates the first surface, is reflected on the second surface to the third surface, is reflected on the third surface back to the first surface, is totally reflected on the first surface and perpendicularly penetrates the second surface; the second reflecting prism unit includes a fourth surface, a fifth surface and a sixth surface; the fourth surface and the second surface face each other; the light coming from the second surface penetrates the fourth surface, is totally reflected on the fifth surface to the sixth surface, is reflected on the sixth surface back to the fourth surface, is totally reflected on the fourth surface and perpendicularly penetrates the fifth surface; the first reflecting unit receives the light from the second reflecting prism unit and reflects the light to the light splitting module.

The invention utilizes the light splitting module to split the incident light into first light beam and the second light beam and to correspondingly form images on the first-light-beam image sensing unit and the second-light-beam image sensing unit. Therefore, the invention can effectively increase the image-sensing area so as to sense the incident light beam as much as possible. Even when the focal length and magnification of the long focal length of the lens module are rather large, the invention can still improve the quality of images.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The purposes, technical solutions and advantages of the invention can be more fully understood by reading the subsequent detailed description and embodiments with references made to the accompanying drawings. However, it is understood that the subsequent detailed description and embodiments are only used for explaining the invention and the invention is not limited thereto.

Figure 1:
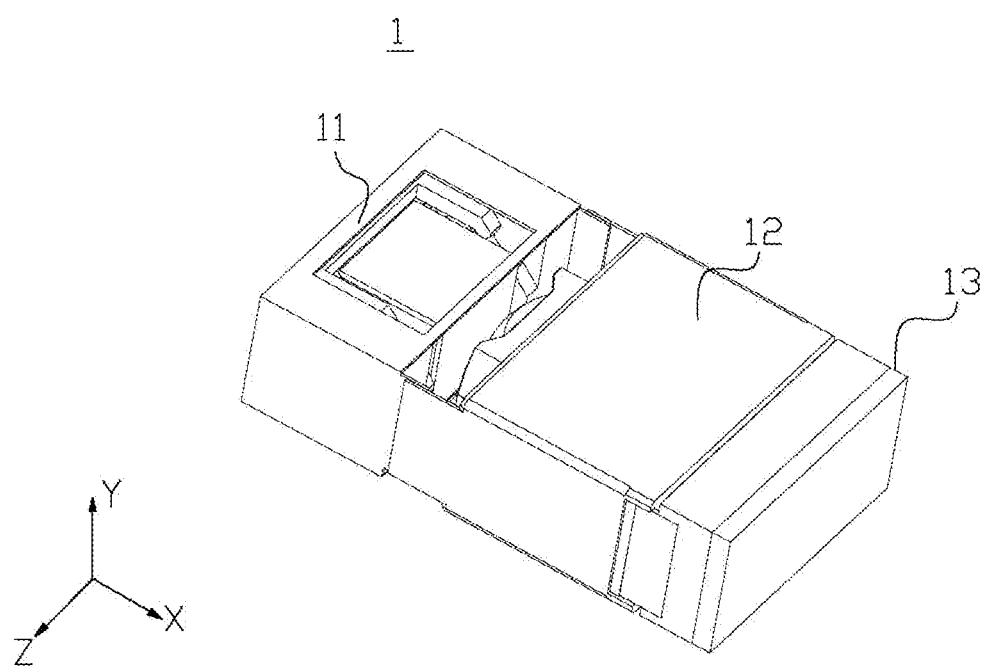
FIG. 1 is a schematic diagram of a known lens device.
Figure 2A:
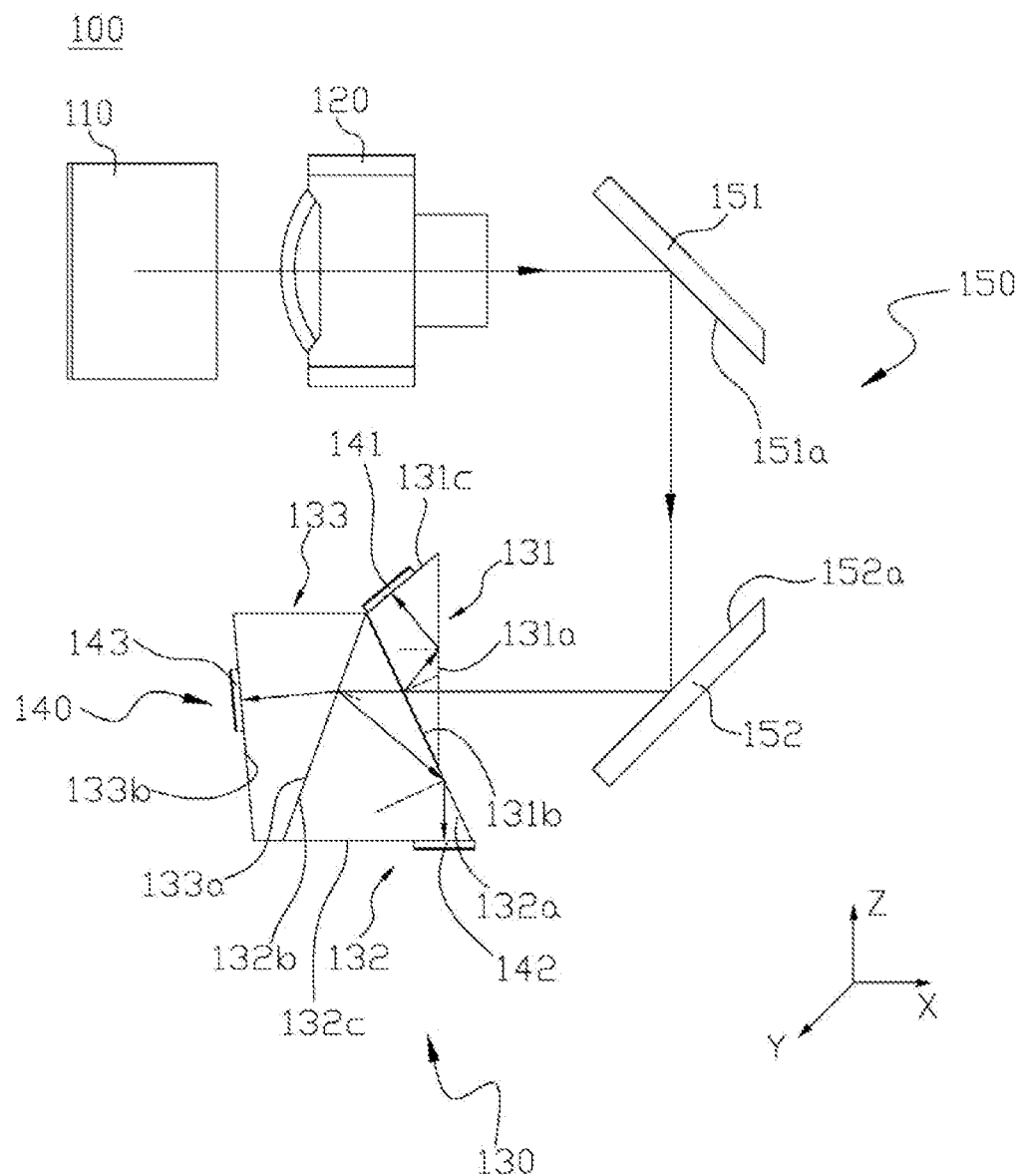
FIG. 2A is a schematic diagram of a lens device in accordance with the first embodiment of the invention.

FIG. 2A is a schematic diagram of a lens device in accordance with the first embodiment of the invention, wherein the lens device 100 includes a plurality of elements which sequentially are a reflecting module 110; a lens module 120 provided with an optical axis extending in a first direction X; a light splitting module 130 configured to split the light beam coming from the lens module 120 into a first light beam, a second light beam and a third light beam; and an image sensor 140 including a first-light-beam image sensing unit 141, a second-light-beam image sensing unit 142 and a third-light-beam image sensing unit 143 for respectively sensing the first light beam, the second light beam and the third light beam. The first light beam, the second light beam and the third light beam have wavelengths of different ranges. For instance, the first light beam may be one of a red light beam, a green light beam, and a blue light beam, the second light beam may be another of them, and the third light beam may be the other. The lens device 100 may further include a light-path turning module 150 disposed between the lens module 120 and the light splitting module 130 along an optical path.

The reflecting module 110 may include a reflecting unit for changing the travel direction of the incident light beam from a second direction Y to the first direction X by reflection, a reflecting-unit carrier for fixing the reflecting unit, and a reflecting-unit fixing seat for carrying the reflecting-unit carrier. The reflecting unit is, for example, a reflecting prism or a reflecting mirror. Preferably, the reflecting unit may include a reflecting surface with metal layer formed from, for example, aluminum, silver and so on. The method of forming the metal layer may be plating, printing, coating and so on. The metal layer is provided for avoiding color cast and light halo. For the lens device, therefore, the light halo can be improved, the spot light source can be effectively concentrated, and the quality of the image forming is good.

The lens module 120 may be a zoom lens module, the focal length of which can be varied through movement of different lenses along the optical axis. The lens module 120 may include a lens-unit fixing seat, a lens unit having an optical axis extended along the first direction X, and a lens-unit carrier connected to the lens-unit fixing seat for carrying the lens unit. The lens-unit carrier can be moved with respect to the lens-unit fixing seat in the first direction, the second direction and/or the third direction, wherein the third direction is perpendicular to the first and second directions. However, the invention is not limited thereto. The lens module 120 may be, for example, a prime lens module, i.e., a fixed focal length lens module.

The light-path turning module 150 includes a first reflecting unit 151 and a second reflecting unit 152. The first reflecting unit 151 includes a first reflecting surface 151a for reflecting the light beam that exits from the lens module 120 to the second reflecting unit 152. The first reflecting surface 151a may be placed at 45° from the first direction X, The second reflecting unit 152 includes a second reflecting surface 152a for reflecting the light beam that exits from the first reflecting surface 151a to the light splitting module 130. The second reflecting surface 152a may be perpendicular to the first reflecting surface 151a. Preferably, the first reflecting surface 151a and the second reflecting surface 152a may include a metal layer formed from, for example, aluminum, silver and so on. The method of forming the metal layer may be plating, printing, coating and so on. The metal layer is provided for avoiding color cast and light halo. For the lens device, therefore, the light halo can be improved, the spot light source can be effectively concentrated, and the quality of the image forming is good.

The light splitting module 130 includes a first prism unit 131, a second prism unit 132 adjacent to the first prism unit 131, and a third prism unit 133 adjacent to the second prism unit 132. The first prism unit 131 includes a first surface 131a allowing the incident light to pass therethrough, a second surface 131b for reflecting the first light beam and allowing the second and third light beams to pass therethrough, and a third surface 131c connected between the first surface 131a and the second surface 131b. The second surface 131b has a first light splitting film coated thereon. The first light beam is reflected on the second surface 131b to the first surface 131a where the incident angle of the first light beam is greater than a critical angle so that the first light beam is totally reflected on the first surface 131a and exits from the third surface 131c. The first-light-beam image sensing unit 141 is disposed adjacent to the third surface 131c for receiving the first light beam that exits from the third surface 131c to form an image. The first surface 131a is arranged in accordance with Snell's law. "Refraction" is the change in direction of a light beam passing from one medium to another medium, wherein the two media have different refractive indices. If a light beam is incident from a medium of higher refractive index to a medium of lower refractive index and the incident angle is greater than the critical angle, then the light beam will be totally reflected back to the medium of higher refractive index without any refraction. That is, there is no refracted light beam but reflected light beam, which is named the total reflection. The critical angle is the smallest angle of incidence that yields total reflection. Accordingly, a light beam incident on a surface at an angle greater than the critical angle is totally reflected thereon rather than passes therethrough.

The first light splitting film on the second surface 131b may be a long-wave pass filter film, allowing a light beam of 400 nm-600 nm to pass therethrough. Therefore, blue light and green light can pass therethrough while red light is reflected thereon.

The second prism unit 132 includes a fourth surface 132a allowing the second and third light beams to pass therethrough, a fifth surface 132b reflecting the second light beam and allowing the third light beam to pass therethrough, and a sixth surface 132c connected between the fourth surface 132a and the fifth surface 132b. The fourth surface 132a and the second surface 131b face each other. The fourth surface 132a and the second surface 131b may be parallel to each other and have an air gap therebetween. The air gap may have a dimension of, for example, 10 μm. The fifth surface 132b has a second light splitting film coated thereon. The second light beam is reflected on the fifth surface 132b to the fourth surface 132a, is totally reflected on the fourth surface 132a, and exits from the sixth surface 132c. The second-light-beam image sensing unit 142 is disposed adjacent to the sixth surface 132c for receiving the second light beam that exits from the sixth surface 132c to form the image.

The second light splitting film on the fifth surface 132b may be a band-pass filter film, allowing a light beam of 500 nm-600 nm to pass therethrough. Therefore, green light can pass therethrough while red light is reflected thereon. It is understood that the ranges of wavelengths of the light beams allowed by the long-wave pass filter film and the band-pass filter film may be adjustable to meet the requirements. For example, the long-wave pass filter film can be adjusted to allow a light beam of 500 nm-700 nm to pass therethrough, and therefore red light and green light can pass therethrough while blue light is reflected thereon. For another example, the band-pass filter film can be adjusted to allow a light beam of 400 nm-600 nm to pass therethrough, and therefore green light can pass therethrough while red light is reflected thereon. Also, the ranges of the wavelengths of light beams handled by the first light splitting film and the second light splitting film can be changed to meet the requirements. However, the invention is not limited thereto.

The third prism unit 133 includes a seventh surface 133a allowing the third light beam to pass therethrough, and an eighth surface 133b for the third light beam to exit therefrom. The seventh surface 133a is disposed adjacent to the fifth surface 132b. The third-light-beam image sensing unit 143 is disposed adjacent to the eighth surface 133b for receiving the third light beam that exits from the eighth surface 133b and for forming the image.

The first prism unit 131 and the second prism unit 132 may be, for example, triangular prisms. A person skilled in the art can understand that the third prism unit 133 is not a necessary element. The third-light-beam image sensing unit 143 can be disposed adjacent to the fifth surface 132b of the second prism unit 132 for receiving the third light beam that exits from the fifth surface 132b.

The lens device 100 further includes an image-combining module to combine the images formed by the first-light-beam image sensing unit 141, the second-light-beam image sensing unit 142 and the third-light-beam image sensing unit 143. The techniques for combing images are known and therefore the descriptions thereof are omitted.

In the invention, the light beam is incident on the reflecting module 110 in the second direction Y, is reflected to the lens module 120 in the first direction X by the reflecting module 110, exits from the lens module 120, reaches the first reflecting unit 151, is reflected by the first reflecting unit 151 to the second reflecting unit 152, is reflected by the second reflecting unit 152 to the light-splitting module 130, passes through the first surface 131a of the light-splitting module 130, and is split into the first light beam, the second light beam and the third light beam. The first light beam is reflected on the second surface 131b to the first surface 131a, is totally reflected on the first surface 131a, exits from the third surface 131c, and reaches the first-light-beam image sensing unit 141. The second light beam and the third light beam pass through the fourth surface 132a and are split on the fifth surface 132b. The second light beam is reflected on the fifth surface 132b to the fourth surface 132a, is totally reflected on the fourth surface 132a, exits from the sixth surface 132c, and reaches the second-light-beam image sensing unit 142. The third light beam passes through the seventh surface 133a, exits from the eighth surface 133b, and reaches the third-light-beam image sensing unit 143.

As described, in the invention, the light-splitting module 130 is used for splitting the incident light beam twice, to form the first, second and third light beams and to form images on the first-light-beam image sensing unit 141, the second-light-beam image sensing unit 142 and the third-light-beam image sensing unit 143. Therefore, the invention can effectively increase the image-sensing area so as to sense the incident light beam as much as possible. Further, when the magnification of the long focal length of the lens module is rather large, the invention can compensate for the insufficient light amount to improve the quality of images.

Figure 2B:
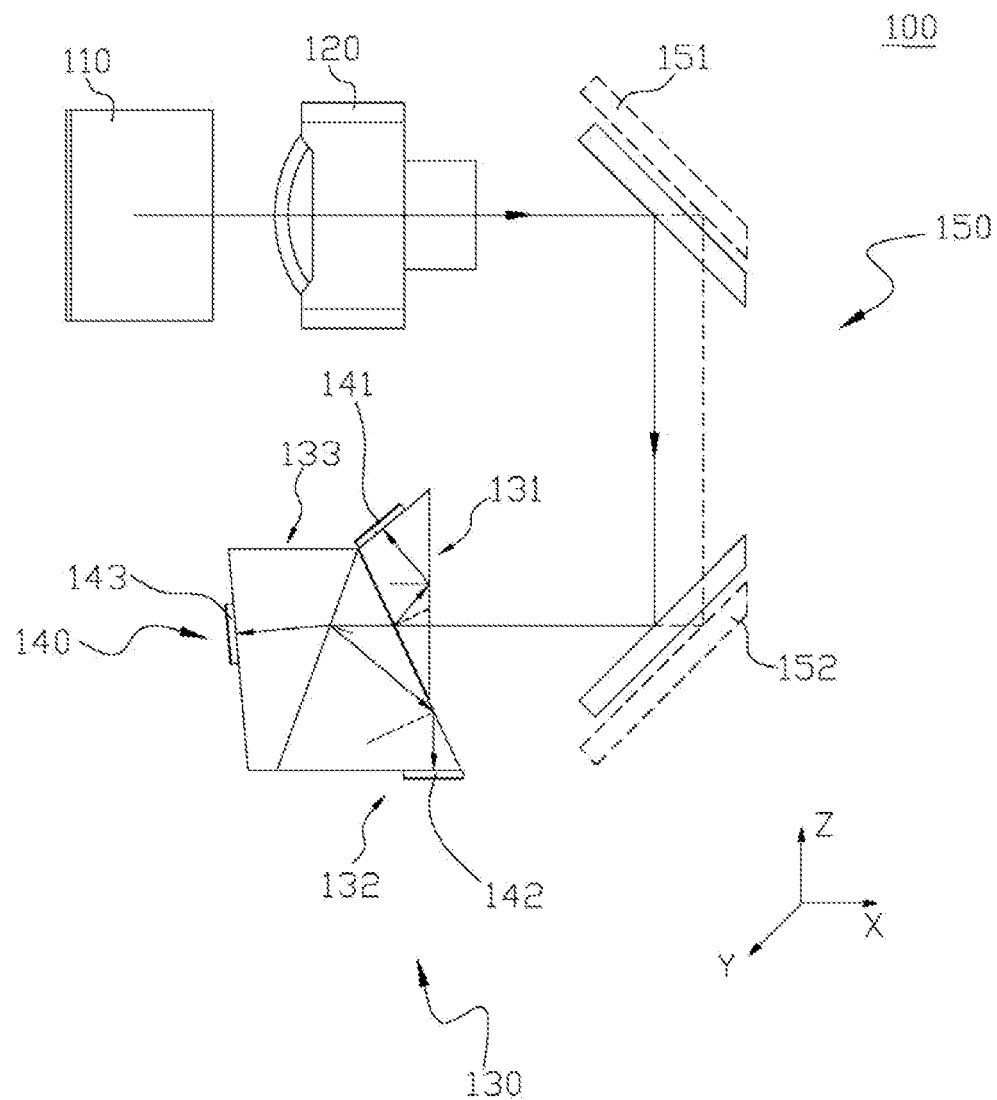
FIG. 2B depicts an optical path of the lens device of the first embodiment of the invention.

In the first embodiment of the invention, the first reflecting unit 151 and the second reflecting unit 152 can be moved in same direction or opposite directions along a Z-axis. Under such a circumstance, the light travel distance between the lens module 120 and the image sensing module 140 can be changed to perform the auto focus and optical image stabilization of the lens device 100. FIG. 2B depicts the optical path of the lens device of the first embodiment of the invention wherein the first reflecting unit 151 and the second reflecting unit 152 are moved away from each other along the Z-axis. In FIG. 2B, the first reflecting unit 151 and the second reflecting unit 152 in initial locations are shown with solid lines, while the first reflecting unit 151 and the second reflecting unit 152 after the movements are shown with broken lines. As shown, the first reflecting unit 151 is moved a distance L1 along the Z-axis and the second reflecting unit 152 is moved a distance L2 along the Z-axis in an opposite direction so that they are farther from each other. As a result, the light travel distance between the lens module 120 and the image sensing module 140 is increased by ΔS=L1+L2 to perform the autofocus operation of the lens device 100 where L1 and L2 are absolute values.

If the first reflecting unit 151 and the second reflecting unit 152 are moved the same distance (i.e. L1=L2) in opposite directions, then the light beam reflected by the second reflecting unit 152 after the movements will travel along the same path as the light beam before the movements. As a result, after the movements, the image-forming location on the image sensing module 140 remains unchanged. Under such a circumstance, the lens device 100 merely performs the autofocus operation. If the first reflecting unit 151 and the second reflecting unit 152 are moved different distances (i.e. L1≠L2) in opposite directions, then the light beam reflected by the second reflecting unit 152 after the movements will travel along a different path. As a result, the image-forming location on the image sensing module 140 after the movements is deviated from that before the movements by A S=|L1−L2|. Under such a circumstance, the lens device 100 can perform the optical image stabilization operation.

When the first reflecting unit 151 and the second reflecting unit 152 are moved along the Z-axis in the same direction, the optical image stabilization operation along the Z-axis is performed.

The autofocus operation of the invention is not limited to what is described above. In a substitute embodiment, the lens module further includes a driving element for driving the lens-unit carrier to move with respect to the lens-unit fixing seat along the X-axis axis in order to perform the autofocus operation.

In the substitute embodiment mentioned above, the lens device can also perform optical image stabilization operation along the Y-axis and the Z-axis in several ways. However, the invention is not limited thereto.

For example, the lens module may include a driving element (not shown) for driving the lens-unit carrier to move with respect to the lens-unit fixing seat along the Y-axis in order to perform the optical image stabilization operation along the Y-axis. The lens module may further include another driving element (not shown) for driving the light-splitting module 130 and the image sensing module 140 to move along the Z-axis in order to perform the optical image stabilization operation along the Z-axis.

For another example, the reflecting-unit carrier is connected to the reflecting-unit fixing seat through a shaft extending along the Z-axis. The lens module 100 further includes a driving element (not shown) for driving the reflecting-unit carrier to rotate about the Z-axis in order to perform the optical image stabilization operation along the Y-axis. The lens module may further include another driving element (not shown) for driving the light-path turning module 150 to move along the X-axis in order to perform the autofocus operation.

Figure 3:
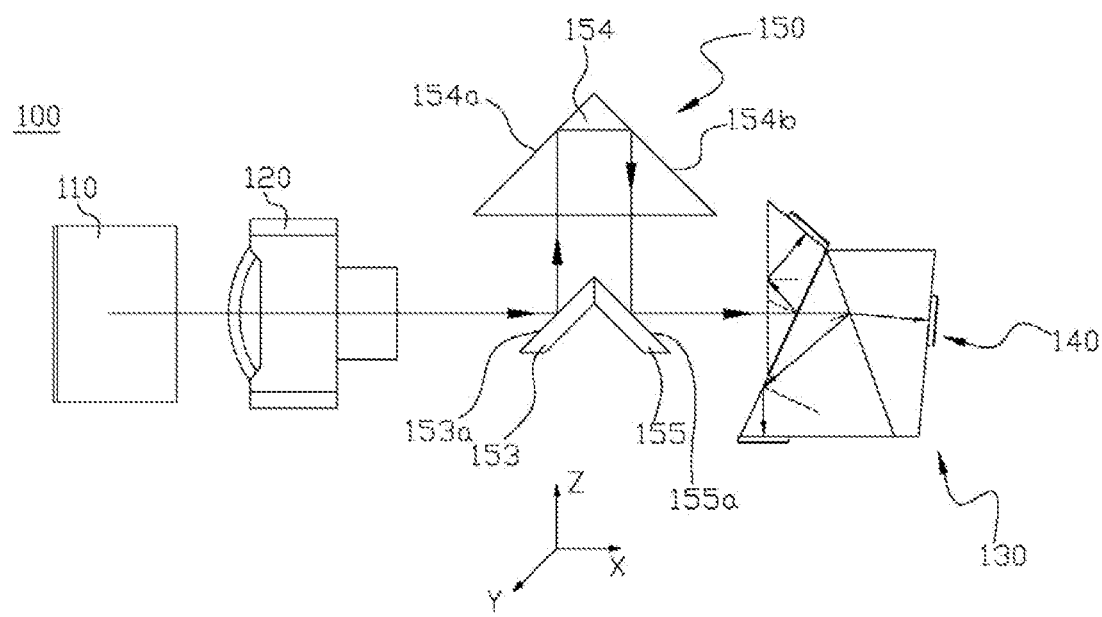
FIG. 3 is a schematic diagram of a lens device in accordance with the second embodiment of the invention.

FIG. 3 is a schematic diagram of a lens device in accordance with the second embodiment of the invention. For simplification, the parts same as or similar to those of the first embodiment are not described. As shown in FIG. 3, the lens device 100 includes a reflecting module 110, a lens module 120, a light splitting module 130 and an image sensor 140. The lens device 100 further includes a light-path turning module 150 disposed between the lens module 120 and the light splitting module 130 in the light path. The second embodiment differs from the first embodiment in the light-path turning module 150 and the light path that is changed because of the light-path turning module 150.

The light-path turning module 150 includes a first reflecting unit 153, a reflecting prism unit 154 and a second reflecting unit 155.

The first reflecting unit 153 includes a front reflecting surface 153a for reflecting the light beam that exits from the lens module 120 to the reflecting prism unit 154. The front reflecting surface 153a may be placed at 45° from the X-axis. The second reflecting unit 155 includes a rear reflecting surface 155a. The rear reflecting surface 155a may be perpendicular to the front reflecting surface 153a where "front" and "rear" are relative terms used in accordance with the arriving time of the light beam but not used to limit the invention. The reflecting prism unit 154 includes a first-prism-unit surface 154a and a second-prism-unit surface 154b. The first-prism-unit surface 154a is configured to reflect the light beam entering the reflecting prism unit 154 to the second-prism-unit surface 154b. The second-prism-unit surface 154b is configured to reflect the light beam coming from the first-prism-unit surface 154a to the rear reflecting surface 155a. The rear reflecting surface 155a is configured to reflect the light beam to the light splitting module 130. It is noted that the first reflecting unit 153 and the second reflecting unit 155 may be integrally formed as a continuous-unity piece.

In the second embodiment, the reflecting prism unit 154 is movable along the Z-axis for change the light travel distance between the lens module 120 and the image sensing module 140 so as to perform the autofocus operation of the lens device 100. When the reflecting prism unit 154 is moved a distance L3 away from the first reflecting unit 153 in the third direction Z, the light travel distance between the lens module 120 and the image sensing module 140 is increased by ΔS=2×L3 where L3 is the absolute value. In a modified embodiment, the reflecting prism unit 154 is rotatable about the Y-axis to perform the optical image stabilization operation of the lens device 100.

The invention is not limited to the autofocus operation described above. In a substitute embodiment, the lens module further includes a driving element for driving the lens-unit carrier to move with respect to the lens-unit fixing seat along the X-axis to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 further includes a driving element (not shown) for driving the reflecting-unit carrier to rotate about the Z-axis in order to perform the optical image stabilization operation along the Y-axis. The lens module may further include another driving element (not shown) for driving the reflecting prism unit 154 of the light-path turning module 150 or driving the first reflecting unit 153 and the second reflecting unit 155 of the light-path turning module 150 to move with respect to the lens module 120 along the X-axis in order to perform the optical image stabilization operation along the Z-axis.

People skilled in the art can understand that the two different light-path turning modules 150 described above are not limited to the first and second embodiments but are applicable to all possible embodiments provided with light-path turning modules 150.

Figure 4:
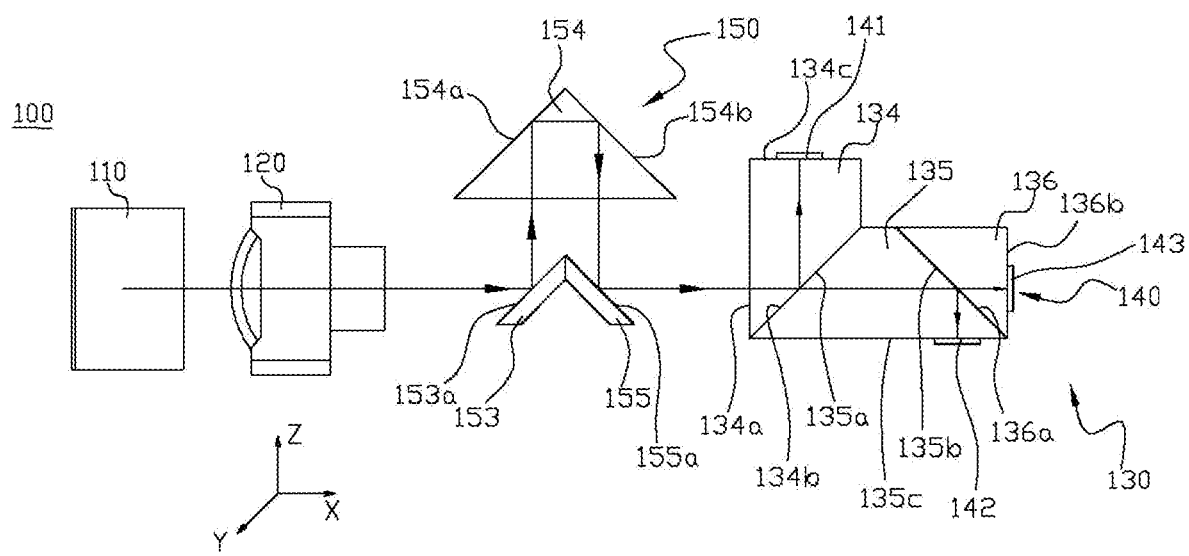
FIG. 4 is a schematic diagram of a lens device in accordance with the third embodiment of the invention.

FIG. 4 is a schematic diagram of a lens device in accordance with the third embodiment of the invention. For simplification, the parts same as or similar to those of the second embodiment are not described. As shown in FIG. 4, the lens device 100 includes a reflecting module 110, a lens module 120, a light splitting module 130 and an image sensor 140. The lens device 100 further includes a light-path turning module 150 disposed between the lens module 120 and the light splitting module 130 in the light path. The third embodiment differs from the second embodiment in structure of the light splitting module 130, placement of the image sensing module 140, and the light path that is changed because of the light splitting module 130 and the image sensing module 140.

As shown in FIG. 4, the light splitting module 130 includes a first prism unit 134, a second prism unit 135 adjacent to the first prism unit 134, and a third prism unit 136 adjacent to the second prism unit 135. The first prism unit 134 includes a first surface 134a allowing the incident light to pass therethrough, a second surface 134b for reflecting the first light beam and allowing the second and third light beams to pass therethrough, and a third surface 134c from which the first light beam exits. The second surface 134b has a first light splitting film coated thereon. The incident light beam is split on the second surface 134b. The first-light-beam image sensing unit 141 is disposed adjacent to the third surface 134c for receiving the first light beam that exits from the third surface 134c to form the image.

The first light splitting film on the second surface 134b may be a long-wave pass filter film, allowing a light beam of 500 nm-700 nm to pass therethrough. Therefore, green light and red light can pass therethrough while blue light is reflected thereon.

The second prism unit 135 includes a fourth surface 135a allowing the second and third light beams to pass therethrough, a fifth surface 135b reflecting the second light beam and allowing the third light beam to pass therethrough, and a sixth surface 135c from which the second light beam exits. The fourth surface 135a and the second surface 134b face each other. The fourth surface 135a and the second surface 134b may be parallel to each other and have an air gap therebetween. The air gap may have a dimension of, for example, 10 µm. Alternatively, the fourth surface 135a may contact the second surface 134b without an air gap formed therebetween. The fifth surface 135b has a second light splitting film coated thereon for splitting of the second and third light beams. The second-light-beam image sensing unit 142 is disposed adjacent to the sixth surface 135c for receiving the second light beam that exits from the sixth surface 135c to form the image.

The second light splitting film on the fifth surface 135b may be a band-pass filter film, allowing a light beam of 600 nm-700 nm to pass therethrough. Therefore, red light can pass therethrough. The ranges of the wavelengths of light beams handled by the first light splitting film and the second light splitting film can be changed to meet the requirements as described in the first embodiment, and therefore the descriptions thereof are omitted.

The third prism unit 136 includes a seventh surface 136a allowing the third light beam to pass therethrough, and an eighth surface 136b for the third light beam to exit therefrom. The seventh surface 136a is disposed adjacent to the fifth surface 135b. The third-light-beam image sensing unit 143 is disposed adjacent to the eighth surface 136b for receiving the third light beam that exits from the eighth surface 136b so as to form the image. People skilled in the art can understand that the third prism unit 133 is not a necessary element.

That is, in the third embodiment, the first light beam that is split directly exits rather than is totally reflected in the first prism unit 134, and the second light beam that is split directly exits rather than is totally reflected in the second prism unit 135. The light-splitting module 130 is used for splitting the incident light beam into the first light beam, the second light beam and the third light beam so as to form images on the first-light-beam sensing unit 141, the second-light-beam sensing unit 142 and the third-light-beam sensing unit 143.

In FIG. 4, the second surface 134b and the fifth surface 135b are disposed at an angle from each other. The angle may be, for example, 90° so that the first light beam and the second light beam are reflected to travel in opposite directions. The first-light-beam sensing unit 141 and the second-light-beam sensing unit 142 are disposed at different sides of the light splitting module 130. The third-light-beam sensing unit 143 is disposed at a side of the light splitting module 130 different from the first-light-beam sensing unit 141 and the second-light-beam sensing unit 142. However, the invention is not limited thereto. In some embodiments, the second surface 134b and the fifth surface 135b are parallel to each other for reflecting the first light beam and the second light beam to travel in same directions. Under such circumstance, the first-light-beam sensing unit 141 and the second-light-beam sensing unit 142 are disposed at the same side of the light splitting module 130, while the third-light-beam sensing unit 143 is disposed at a different side.

In the described embodiments, the reflecting prism unit 154 is movable along the Z-axis for changing the light travel distance between the lens module 120 and the image sensing module 140 to perform the autofocus operation of the lens device 100.

However, the invention is not limited to the autofocus operation described above. In a substitute embodiment, the lens module further includes a driving element for driving the lens-unit carrier to move with respect to the lens-unit fixing seat along the X-axis to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 further includes a driving element (not shown) for driving the reflecting-unit carrier to rotate about the Z-axis in order to perform the optical image stabilization operation along the Y-axis. The lens module may further include another driving element for driving the reflecting unit 110 to move with respect to the lens module 120 along the Z-axis in order to perform the optical image stabilization operation along the Z-axis.

Figure 5A:
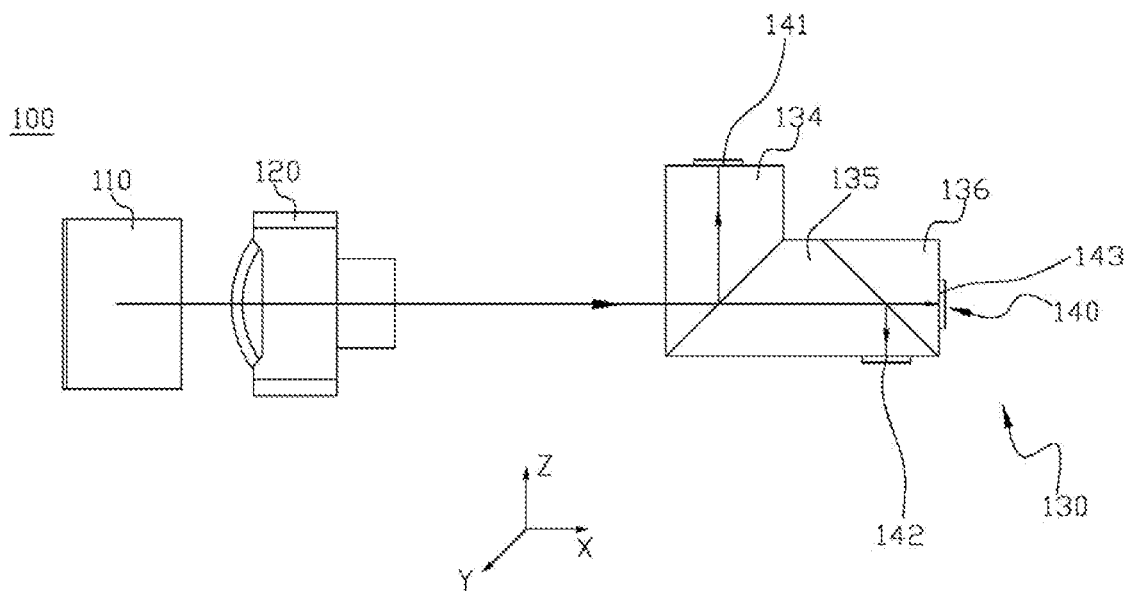
FIG. 5A is a schematic diagram of a lens device in accordance with the fourth embodiment of the invention.

FIG. 5A is a schematic diagram of a lens device in accordance with the fourth embodiment of the invention. For simplification, the parts same as or similar to those of the third embodiment are not described. As shown in FIG. 5A, the lens device 100 of the fourth embodiment includes a reflecting module 110, a lens module 120, a light splitting module 130 and an image sensor 140. The fourth embodiment differs from the third embodiment in that no light-path turning module 150 is provided therein.

In the fourth embodiment, the lens module further includes a driving element for driving the lens-unit carrier to move with respect to the lens-unit fixing seat along the X-axis to perform the autofocus operation.

In the fourth embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module further includes a driving element for driving the reflecting-unit carrier to rotate about the Z-axis in order to perform the optical image stabilization operation along the Y-axis. The lens module may further include another driving element for driving the reflecting unit 110 to move with respect to the lens module 120 along the Z-axis in order to perform the optical image stabilization operation along the Z-axis.

Figure 5B:
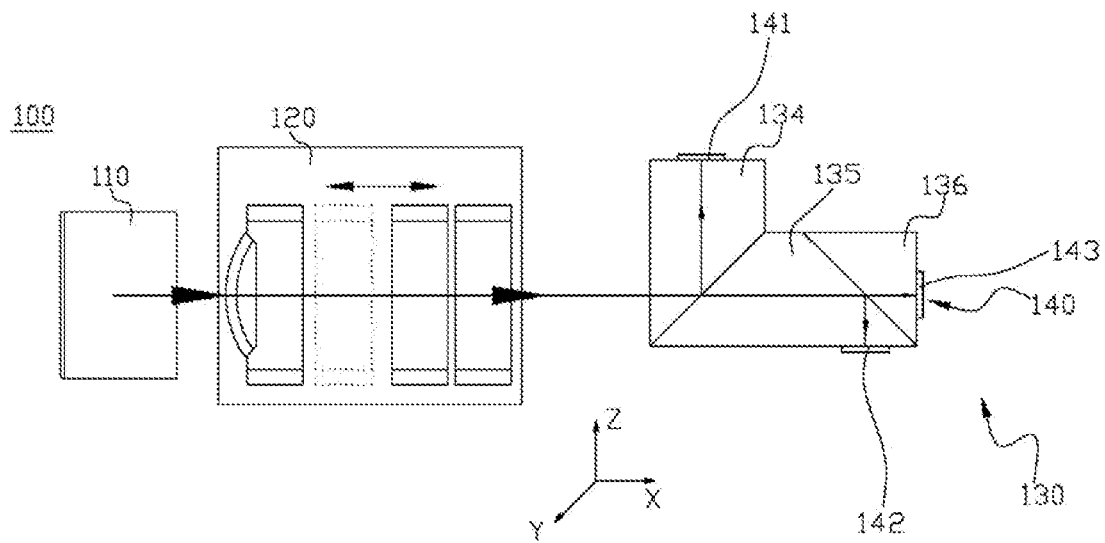
FIG. 5B is another schematic diagram of a lens device in accordance with the fourth embodiment of the invention.

FIG. 5B is another schematic diagram of a lens device in accordance with the fourth embodiment of the invention, wherein the lens module 120 is a zoom lens module, the focal length of which can be changed by moving different lenses along the optical axis. Specifically, as shown in FIG. 5B, a lens group is moved along the optical axis to perform the zooming operation. Further, in FIG. 5B, the location of the lens group before the zooming operation is shown with solid lines and the location of the lens group after the zooming operation is shown with broken lines, thereby switching the magnification of the focal length. The zooming operation shown in FIG. 5B is applicable to all possible embodiments.

Figure 6:
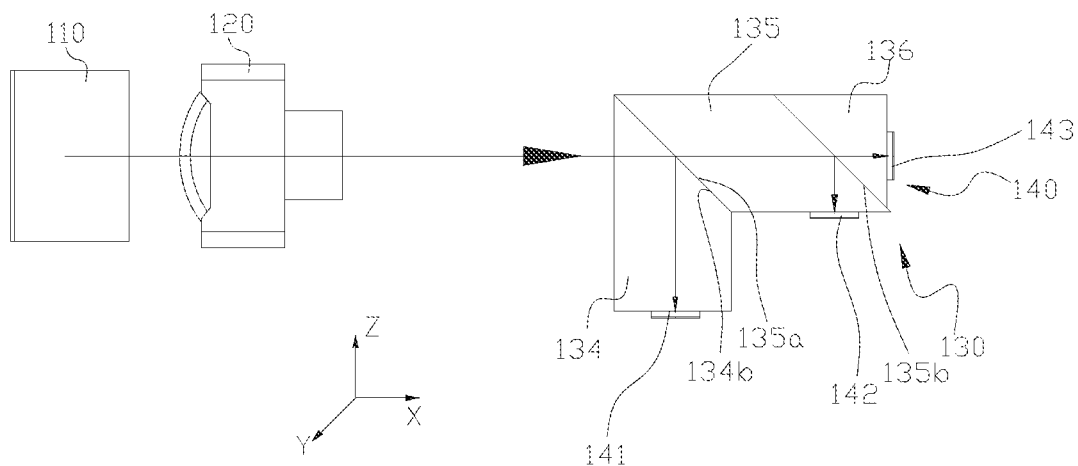
FIG. 6 is a schematic diagram of a lens device in accordance with the fifth embodiment of the invention.

FIG. 6 is a schematic diagram of a lens device in accordance with the fifth embodiment of the invention. For simplification, the parts same as or similar to those of the fourth embodiment are not described. As shown in FIG. 6, the lens device 100 includes a reflecting module 110, a lens module 120, a light splitting module 130 and an image sensor 140. The fifth embodiment differs from the fourth embodiment in the light splitting module 130, and placement of each image sensing units of the image sensing module 140.

In the fifth embodiment, the second surface 134b, the fourth surface 135a and the fifth surface 135b are in parallel. The first light beam and the second light beam are reflected to travel in the same direction. The first-light-beam image sensing unit 141 and the second-light-beam image sensing unit 142 are disposed at the same side of the light splitting module 130.

Figure 7:
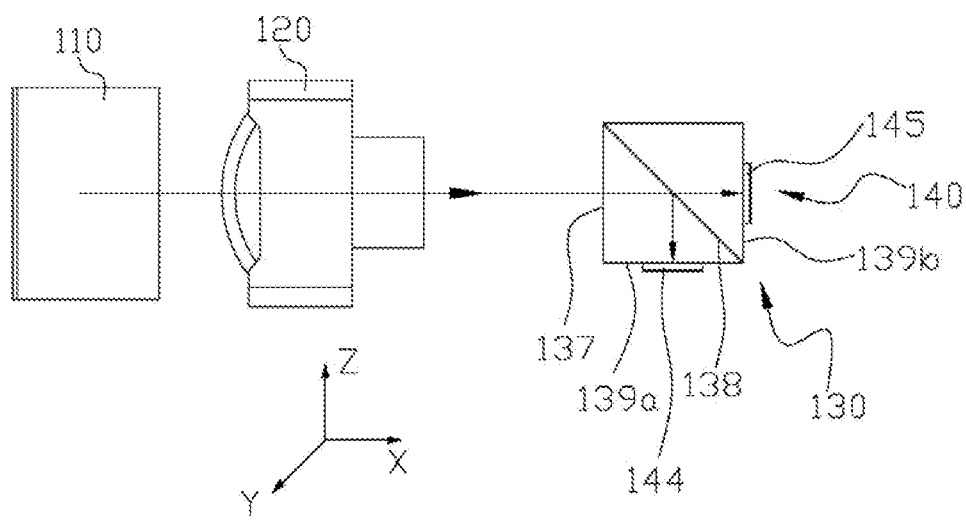
FIG. 7 is a schematic diagram of a lens device in accordance with the sixth embodiment of the invention.

FIG. 7 is a schematic diagram of a lens device in accordance with the sixth embodiment of the invention. For simplification, the parts same as or similar to those of the fourth embodiment are not described. As shown in FIG. 7, the lens device 100 includes a reflecting module 110, a lens module 120, a light splitting module 130 and an image sensor 140. Similarly, no light-path turning module is provided in the sixth embodiment. The sixth embodiment differs from the fourth embodiment in the light splitting module 130.

The light splitting module 130 includes a light incident surface 137, a light splitting surface 138, a first exiting surface 139a, and a second exiting surface 139b. The light incident surface 137 allows the light to enter. The light splitting surface 138 has a transflective film coated thereon for splitting the incident light into the first light beam and the second light beam wherein the first light beam passes through the light splitting surface 138 while the second light beam is reflected on the light splitting surface 138. The first exiting surface 139a allows the first light beam to exit therefrom. The second exiting surface 139b allows the second light beam to exit therefrom. The image sensing module 140 includes a first imaging sensing unit 144 disposed adjacent to the first exiting surface 139a, a second imaging sensing unit 145 disposed adjacent to the second exiting surface 139b, a fast optical filter disposed between the first image sensing unit 144 and the first exiting surface 139a, and a second optical filter disposed between the second image sensing unit 145 and the second exiting surface 139b. The first optical filter can be used for filtering out red light from the first light beam because light beams in different colors have different light wave bands. Similarly, the second optical filter can be used for filtering out blue light from the second light beam because light beams in different colors have different light wave bands.

The light splitting surface 138 may be coated with a dielectric optical splitter. The first optical filter may be coated with a short-wave pass filter film, allowing a light beam of 400 nm-600 nm to pass therethrough. Therefore, blue light and green light can pass therethrough while red light is reflected thereon. The second optical filter may be coated with a long-wave pass filter film, allowing a light beam of 500 nm-700 nm to pass therethrough. Therefore, green light and red light can pass therethrough while blue light is reflected thereon.

The first light beam only has green light and blue light (GB light) after red light is filtered out. The second light beam only has green light and red light (GR light) after blue light is filtered out. The first image sensing unit 144 receives the GB light to generate a first image, the second image sensing unit 145 receives the GR light to generate a second image, and the first image and the second image are combined into a resultant image by using the technique of Bayer matrix.

As described, in this embodiment, the light-splitting module 130 is used for splitting the incident light beam once, to form the first and second light beams and to form images on the first-light-beam image sensing unit 144 and the second-light-beam image sensing unit 145. Therefore, the invention can effectively increase the image-sensing area so as to sense the incident light beam as much as possible. Further, when the magnification of the long focal length of the lens module is rather large, the invention can compensate for the insufficient light amount to improve the quality of images.

In this embodiment, the lens module further includes a driving element for driving the lens unit carrier to move with respect to the lens-unit fixing seat along the X-axis so as to perform the autofocus operation.

In this embodiment, the lens device can perform the optical image stabilization operation along the Y-axis and Z-axis in some different ways. However, the invention is not limited thereto.

For example, the reflecting-unit carrier is connected to the reflecting-unit fixing seat through a shaft extending along the Z-axis. The lens module may include a driving element for driving the reflecting-unit carrier to rotate about the Z-axis in order to perform the optical image stabilization operation along the Y-axis. The lens module may further include another driving element for driving the reflecting module 110 to move with respect to the lens module 120 along the Z-axis in order to perform the optical image stabilization operation along the Z-axis.

Figure 8:
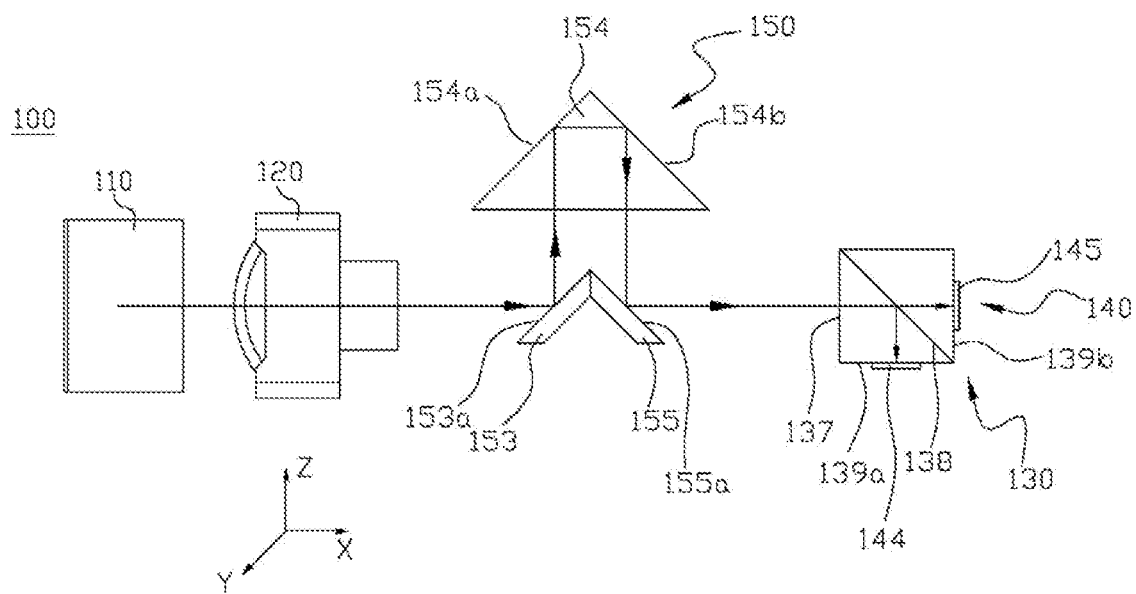
FIG. 8 is a schematic diagram of a lens device in accordance with the seventh embodiment of the invention.

FIG. 8 is a schematic diagram of a lens device in accordance with the seventh embodiment of the invention. For simplification, the parts same as or similar to those of the sixth embodiment are not described. As shown in FIG. 8, the lens device 100 includes a reflecting module 110, a lens module 120, a light splitting module 130 and an image sensor 140. The seventh embodiment differs from the fifth embodiment in that a light-path turning module 150 is provided in the seventh embodiment and the light-path turning module 150 is identical to that of the second embodiment. Therefore, the light-path turning module 150 is not described again.

In this embodiment, the reflecting prism unit 154 is movable along the Z-axis to change the light travel distance between the lens module 120 and the image sensing module 140 so as to perform the autofocus operation of the lens device 100.

The autofocus operation of the invention is not limited to what is described above. In a substitute embodiment, the lens module further includes a driving element for driving the lens-unit carrier to move with respect to the lens-unit fixing seat along the X-axis in order to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the lens-unit carrier to rotate about the Z-axis in order to perform the optical image stabilization operation along the Y-axis. The lens module 100 may further include another driving element for driving the reflecting prism unit 154 of the light-path turning module 150 or driving the first reflecting unit 153 and the second reflecting unit 155 of the light-path turning module 150 to move along the X-axis in order to perform the optical image stabilization operation along the Z-axis.

Figure 9:
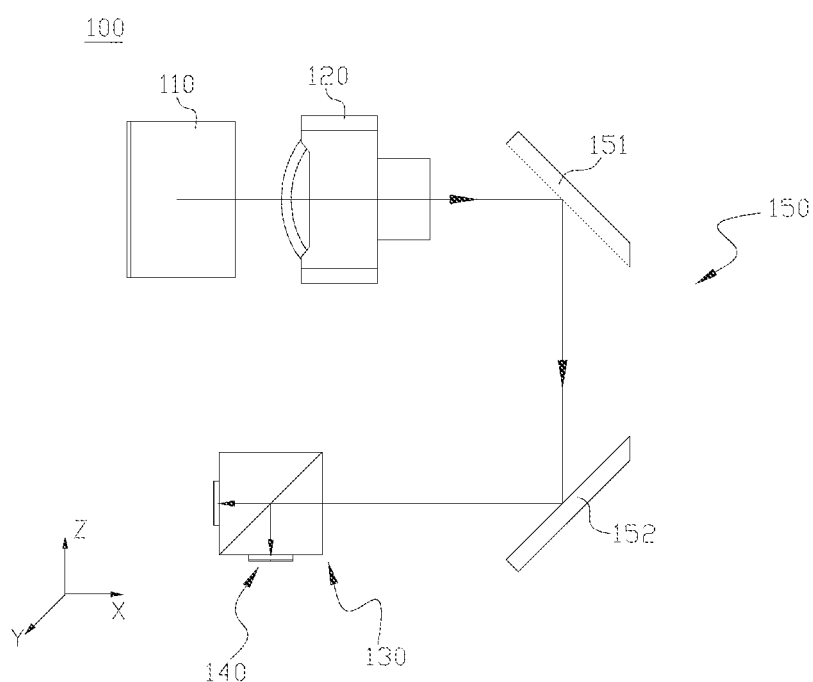
FIG. 9 is a schematic diagram of a lens device in accordance with the eighth embodiment of the invention.

FIG. 9 is a schematic diagram of a lens device in accordance with the eighth embodiment of the invention that is an embodiment modified from the sixth embodiment. For simplification, the parts same as or similar to those of the sixth embodiment are not described. As shown in FIG. 9, the lens device 100 includes a reflecting module 110, a lens module 120, a light splitting module 130 and an image sensor 140. The eighth embodiment differs from the sixth embodiment in that a light-path turning module 150 is provided in the eighth embodiment and the light-path turning module 150 is identical to that of the first embodiment. Therefore, the light-path turning module 150 is not described again.

In this embodiment, the first reflecting unit 151 and the second reflecting unit 152 are movable along the Z-axis to change the light travel distance between the lens module 120 and the image sensing module 140 so as to perform the autofocus operation of the lens device 100 and to perform the optical image stabilization operation of the lens device 100 along the Z-axis.

The autofocus operation of the invention is not limited to what is described above. In a substitute embodiment, the lens module further includes a driving element for driving the lens-unit carrier to move with respect to the lens-unit fixing seat along the X-axis in order to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the reflecting-unit carrier to rotate about the Z-axis in order to perform the optical image stabilization operation along the Y-axis. The lens module 100 may further include another driving element for driving the light-path turning module 150 to move with respect to the lens module 120 along the X-axis in order to perform the autofocus operation.

Figure 10:
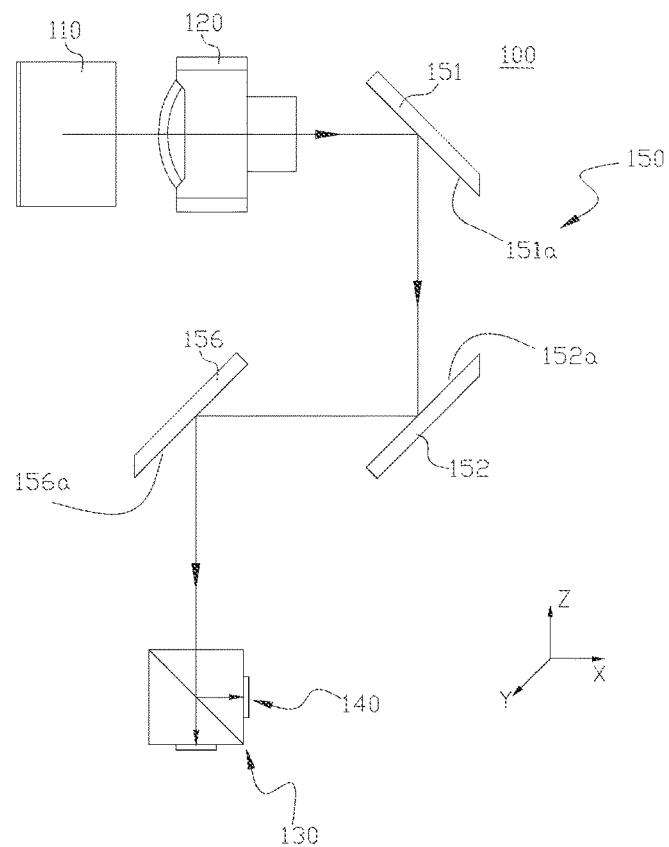
FIG. 10 is a schematic diagram of a lens device in accordance with the ninth embodiment of the invention.

FIG. 10 is a schematic diagram of a lens device in accordance with the ninth embodiment of the invention that is an embodiment modified from the eighth embodiment. For simplification, the parts same as or similar to those of the eighth embodiment are not described. As shown in FIG. 10, the lens device 100 includes a reflecting module 110, a lens module 120, a light-path turning module 150, a light splitting module 130 and an image sensor 140. The ninth embodiment differs from the eighth embodiment in the structure of the light-path turning module 150.

The light-path turning module 150 includes a first reflecting unit 151, a second reflecting 152 and a third reflecting unit 156. The first reflecting unit 151 includes a first reflecting surface 151a for reflecting the light beam that exits from the lens module 120 to the second reflecting unit 152. The first reflecting surface 151a may be disposed at 45' from the X-axis. The second reflecting unit 152 includes a second reflecting surface 152a for reflecting the light beam that comes from the first reflecting surface 151a to the third reflecting unit 152. The second reflecting surface 152a may be perpendicular to the first reflecting surface 151a. The third reflecting unit 156 includes a third reflecting surface 156a for reflecting the light beam that comes from the second reflecting surface 152a to the light splitting unit 130. The third reflecting surface 156a may be parallel to the second reflecting surface 152a.

In this embodiment, the first reflecting unit 151 and the second reflecting unit 152 are movable along the Z-axis in the same direction or in opposite directions to change the light travel distance between the lens module 120 and the image sensing module 140 so as to perform the autofocus operation and the optical image stabilization operation of the lens device 100.

The autofocus operation of the invention is not limited to what is described above. In a substitute embodiment, the lens module further includes a driving element for driving the lens-unit carrier to move with respect to the lens-unit fixing seat along the X-axis in order to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the reflecting-unit carrier to rotate about the Z-axis in order to perform the optical image stabilization operation along the Y-axis. The lens module 100 may further include another driving element for driving the light-path turning module 150 to move with respect to the lens module 120 along the X-axis in order to perform the autofocus operation.

Figure 11:
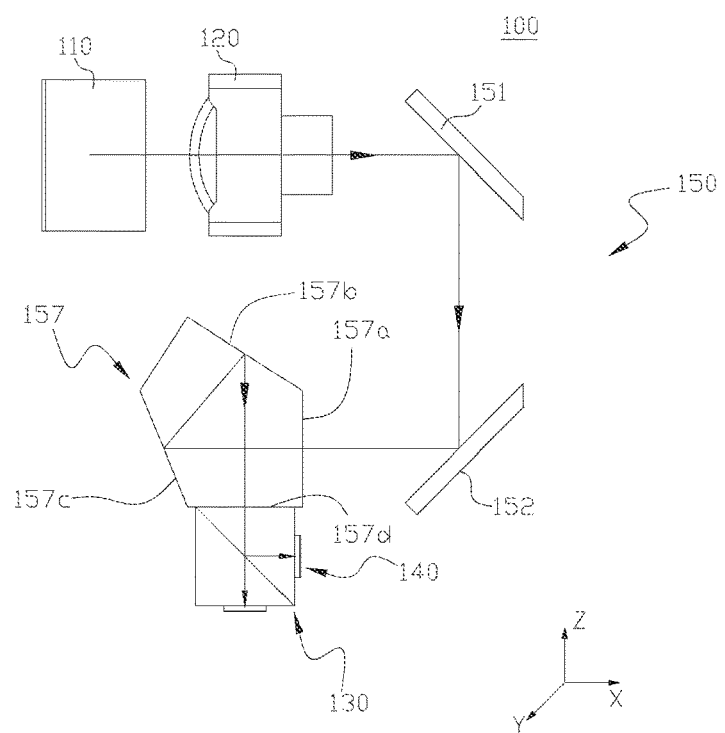
FIG. 11 is a schematic diagram of a lens device in accordance with the tenth embodiment of the invention.

FIG. 11 is a schematic diagram of a lens device in accordance with the tenth embodiment of the invention that is an embodiment modified from the eighth embodiment. For simplification, the parts same as or similar to those of the eighth embodiment are not described. As shown in FIG. 11, the lens device 100 includes a reflecting module 110, a lens module 120, a light-path turning module 150, a light splitting module 130 and an image sensor 140. The tenth embodiment differs from the eighth embodiment in the structure of the light-path turning module 150.

The light-path turning module 150 includes a first reflecting unit 151, a second reflecting unit 152 and a reflecting prism unit 157. Along the light path, the reflecting prism unit 157 is disposed after the second reflecting unit 152 and before the light splitting module 130. That is, the reflecting prism unit 157 is disposed between the second reflecting unit 152 and the light splitting module 130.

The reflecting prism unit 157 includes a first prism incident surface 157a perpendicular to the X-axis, a first prism reflecting surface 157c for reflecting the light beam, a second prism reflecting surface 157b for receiving and reflecting the light beam that is reflected on the first prism reflecting surface 157c, and a first prism exiting surface 157d parallel to the X-axis. The first prism exiting surface 157d is disposed adjacent to the light incident surface 137 of the light splitting module 130. Further, the first prism exiting surface 157d and the light incident surface 137 may be disposed in parallel.

The first prism incident surface 157a may have an all-dielectric high-transmission film coated thereon that allows 98% of light to pass therethrough. The second prism reflecting surface 157b and the first prism reflecting surface 157c may have high-reflection films coated thereon.

In operation, a light beam is incident on the reflecting module 110 in the second direction Y, is reflected by the reflecting module 110 to the lens module 120 in the first direction X, exits from the lens module 120, reaches the first reflecting unit 151 of the light-path turning module 150 and then the second reflecting unit 152 by reflection, is reflected to the reflecting prism unit 157, enters the first prism incident surface 157a, is reflected on the first prism reflecting surface 157c to the second prism reflecting surface 157b, is reflected on the second prism reflecting surface 157b, exits from the first prism exiting surface 157d, enters the light splitting module 130, and is split by the light splitting module 130.

The reflecting prism unit 157 may be a penta prism. It is advantageous to increase the focal length and magnification for the optical zoom in a limited space. That is, a long focal length can be achieved in a limited space by using a penta prism.

In this embodiment, the first reflecting unit 151 and the second reflecting unit 152 are movable along the Z-axis in the same direction or in opposite directions to change the light travel distance between the lens module 120 and the image sensing module 140 so as to perform the autofocus operation of the lens device 100 and to perform the optical image stabilization operation of the lens device 100 along the X-axis.

The autofocus operation of the invention is not limited to what is described above. In a substitute embodiment, the lens module further includes a driving element for driving the lens-unit carrier to move with respect to the lens-unit fixing seat along the X-axis in order to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the reflecting-unit carrier to rotate about the Z-axis in order to perform the optical image stabilization operation along the Y-axis. The lens module 100 may further include another driving element for driving the light-path turning module 150 to move with respect to the lens module 120 along the X-axis in order to perform the autofocus operation.

Figure 12:
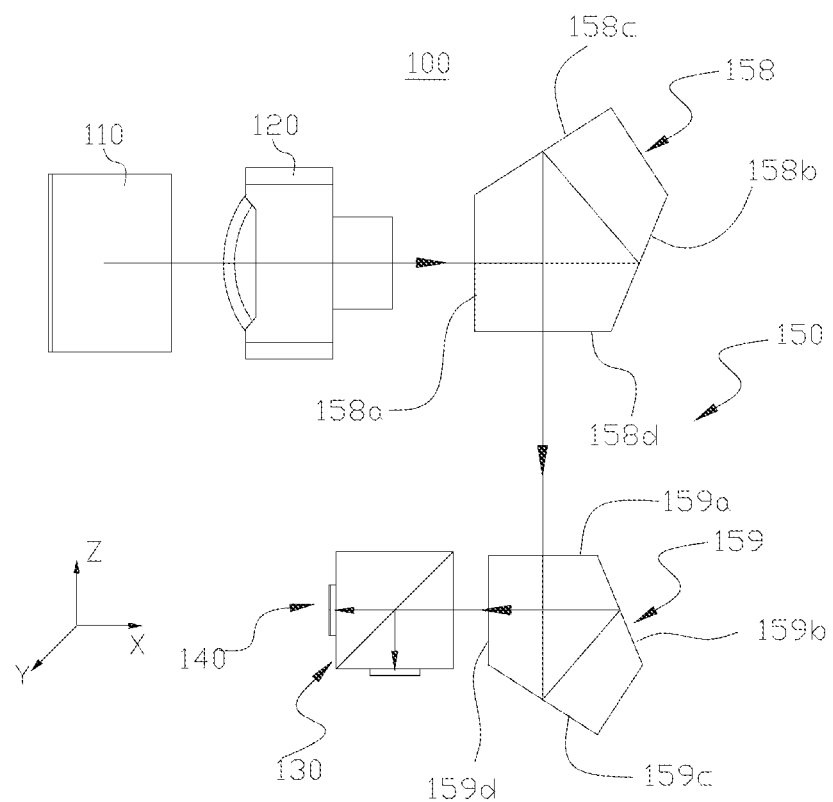
FIG. 12 is a schematic diagram of a lens device in accordance with the eleventh embodiment of the invention.

FIG. 12 is a schematic diagram of a lens device in accordance with the eleventh embodiment of the invention that is an embodiment modified from the seventh and tenth embodiments. For simplification, the parts same as or similar to those of the seventh and tenth embodiments are not described. As shown in FIG. 12, the lens device 100 includes a reflecting module 110, a lens module 120, a light-path turning module 150, a light splitting module 130 and an image sensor 140. The eleventh embodiment differs from the seventh and tenth embodiments in the structure of the light-path turning module 150.

The light-path turning module 150 includes a first reflecting prism unit 158 and a second reflecting prism unit 159.

The first reflecting prism unit 158 includes a first prism incident surface 158a perpendicular to the X-axis, a first prism reflecting surface 158a for reflecting the light beam, a second prism reflecting surface 158c for receiving and reflecting the light beam that is reflected on the first prism reflecting surface 158b, and a first prism exiting surface 158d parallel to the X-axis.

The first prism incident surface 158a may have an all-dielectric high-transmission film coated thereon that allows 98% of light to pass therethrough. The first prism reflecting surface 158b and the second prism reflecting surface 158c may have high-reflection films coated thereon.

The second reflecting prism unit 159 includes a second prism incident surface 159a parallel to the X-axis, a third prism reflecting surface 159c for reflecting the light beam, a fourth prism reflecting surface 159b for receiving and reflecting the light beam that is reflected on the third prism reflecting surface 159c, and a second prism exiting surface 159d perpendicular to the X-axis. The second prism exiting surface 159d is disposed adjacent to the light incident surface 137 of the light splitting module 130. Further, the second prism exiting surface 159d and the light incident surface 137 may be disposed in parallel.

The second prism incident surface 159a may have an all-dielectric high-transmission film coated thereon that allows 98% of light to pass therethrough. The third prism reflecting surface 159c and the fourth prism reflecting surface 159b may have high-reflection films coated thereon.

In operation, a light beam is incident on the reflecting module 110 in the second direction Y, is reflected by the reflecting module 110 to the lens module 120 in the first direction X, exits from the lens module 120, enters the first prism incident surface 158a of the first reflecting prism unit 158, is reflected on the first prism reflecting surface 158b to the second prism reflecting surface 158c, is reflected on the second prism reflecting surface 158c, exits from the first prism exiting surface 158d, enters the second prism incident surface 159a of the second reflecting prism unit 159, is reflected on the third prism reflecting surface 159c to the fourth prism reflecting surface 159b, is reflected on the fourth prism reflecting surface 159b, exits from the second prism exiting surface 159d, enters the light splitting module 130, and is split by the light splitting module 130.

In this embodiment, the first prism reflecting surface 158b is disposed at an obtuse angle from the X-axis. The second reflecting prism unit 159 is disposed at a side of the first reflecting prism unit 158 in a direction opposite to the third direction Z. That is, the first reflecting prism unit 158 and the second reflecting prism unit 159 are arranged along the Z-axis.

The first reflecting prism unit 158 and the second reflecting prism unit 159 may be penta prisms. It is advantageous to increase the focal length and magnification for the optical zoom by using the two penta prisms.

In this embodiment, the first reflecting prism unit 158 and the second reflecting prism unit 159 are movable along the Z-axis in the same direction or in opposite directions to change the light travel distance between the lens module 120 and the image sensing module 140 so as to perform the autofocus operation of the lens device 100 and to perform the optical image stabilization operation of the lens device 100 along the Z-axis.

The autofocus operation of the invention is not limited to what is described above. In a substitute embodiment, the lens module further includes a driving element for driving the lens-unit carrier to move with respect to the lens-unit fixing seat along the X-axis in order to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the lens-unit carrier to rotate about the Z-axis in order to perform the optical image stabilization operation along the Y-axis. The lens module 100 may further include another driving element for driving the light-path turning module 150 to move with respect to the lens module 120 along the X-axis in order to perform the autofocus operation.

Figure 13:
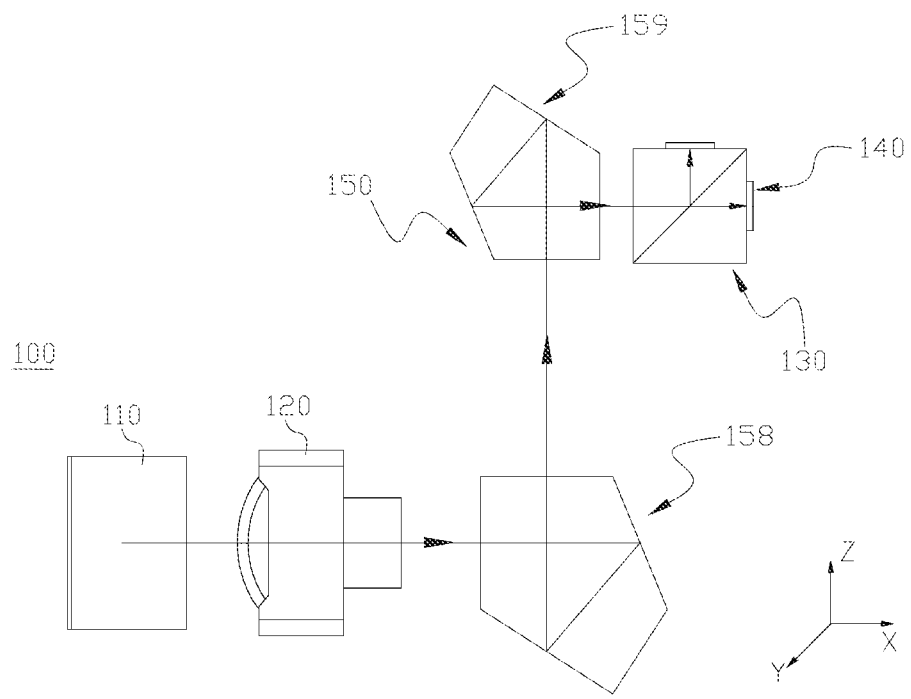
FIG. 13 is a schematic diagram of a lens device in accordance with the twelfth embodiment of the invention.

FIG. 13 is a schematic diagram of a lens device 100 in accordance with the twelfth embodiment of the invention that is an embodiment modified from the eleventh embodiment. For simplification, the parts same as or similar to those of the eleventh embodiment are not described.

The twelfth embodiment differs from the eleventh embodiment in that the first prism reflecting surface 158b is disposed at an acute angle from the X-axis, and the second reflecting prism unit 159 is disposed at a side of the first reflecting prism unit 158 in the third direction Z.

Figure 14:
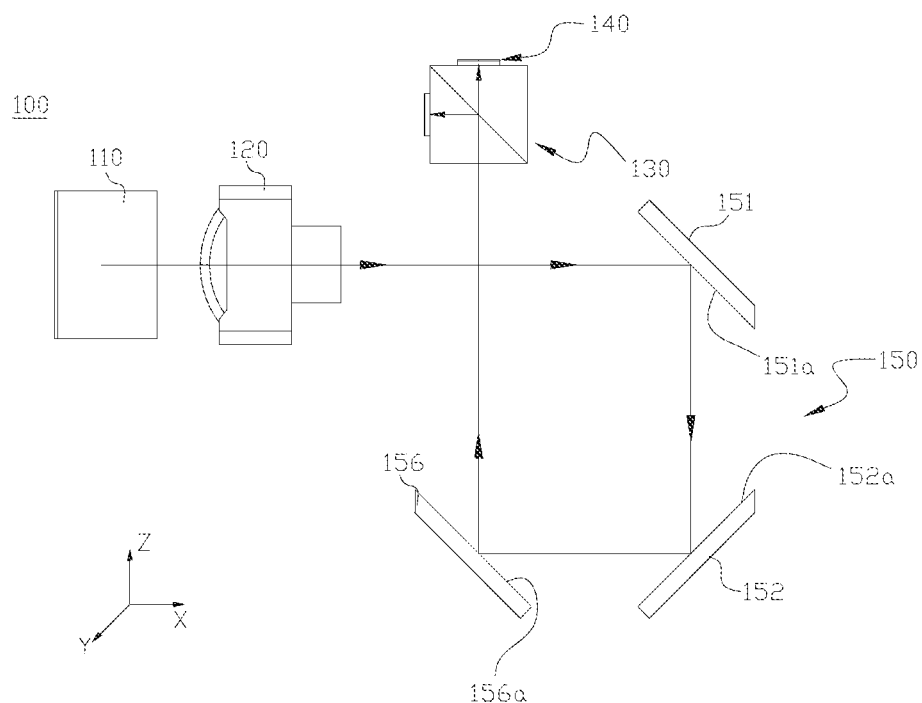
FIG. 14 is a schematic diagram of a lens device in accordance with the thirteenth embodiment of the invention.

FIG. 14 is a schematic diagram of a lens device in accordance with the thirteenth embodiment of the invention that is an embodiment modified from the ninth embodiment. For simplification, the parts same as or similar to those of the ninth embodiment are not described. As shown in FIG. 14, the lens device 100 includes a reflecting module 110, a lens module 120, a light-path turning module 150, a light splitting module 130 and an image sensor 140. The thirteenth embodiment differs from the ninth embodiment in the structure of the light-path turning module 150.

In this embodiment, the third reflecting surface 156a may be perpendicular to the second reflecting surface 152a for reflecting the light that comes from the second reflecting surface 152a to the light splitting module 130. Accordingly, the lens device 100 can be more compact and be suitable for more limited space.

Figure 15:
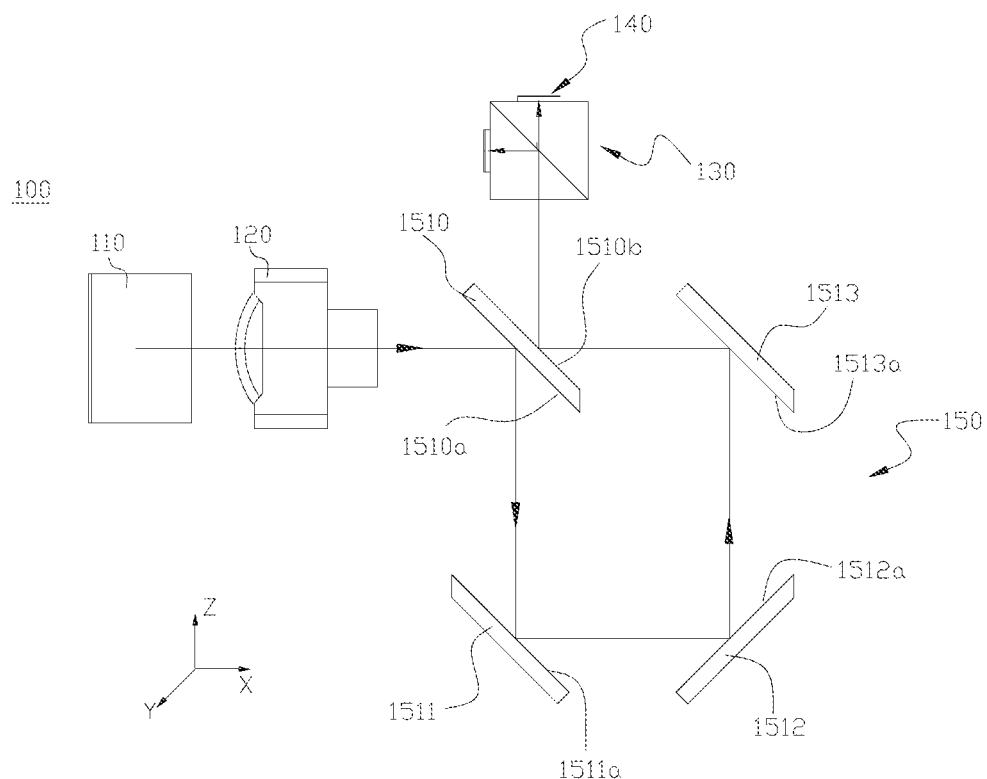
FIG. 15 is a schematic diagram of a lens device in accordance with the fourteenth embodiment of the invention.

FIG. 15 is a schematic diagram of a lens device in accordance with the fourteenth embodiment of the invention that is an embodiment modified from the thirteenth embodiment. For simplification, the parts same as or similar to those of the thirteenth embodiment are not described. As shown in FIG. 15, the lens device 100 includes a reflecting module 110, a lens module 120, a light-path turning module 150, a light splitting module 130 and an image sensor 140. The fourteenth embodiment differs from the thirteenth embodiment in the structure of the light-path turning module 150.

The light-path turning module 150 includes a first reflecting unit 1510, a second reflecting unit 1511, a third reflecting unit 1512 and a fourth reflecting unit 1513. The first reflecting unit 1510 includes a first front reflecting surface 1510a and a first rear reflecting surface 1510b. The first front reflecting surface 1510a and the first rear reflecting surface 1510b are two opposite surfaces of the first reflecting unit 1510. The first front reflecting surface 1510a is configured to reflect the light that exits from the lens module 120 to the second reflecting unit 1511. Further, the first front reflecting surface 1510a may be disposed at 45° from the X-axis. The second reflecting unit 1511 includes a second reflecting surface 1511a for reflecting the light that comes from the first front reflecting surface 1510a to the third reflecting unit 1512. The second reflecting surface 1511a may be parallel to the first front reflecting surface 1510a. The third reflecting unit 1512 includes a third reflecting surface 1512a. The third reflecting surface 1512a may be perpendicular to the second reflecting surface 1511a for reflecting the light that comes from the second reflecting surface 1511a to the fourth reflecting unit 1513. The fourth reflecting unit 1513 includes a fourth reflecting surface 1513a. The fourth reflecting surface 1513a may be perpendicular to the third reflecting surface 1512a for reflecting the light that comes from the third reflecting surface 1512a to the first rear reflecting surface 1510b. The first tear reflecting surface 1510b is parallel to the fourth reflecting surface 1513a for reflecting the light to the light splitting module 130.

In this embodiment, the third reflecting unit 1512 and the fourth reflecting unit 1513 are movable along the Z-axis in the same direction or in opposite directions to change the light travel distance between the lens module 120 and the image sensing module 140 so as to perform the autofocus operation of the lens device 100 and to perform the optical image stabilization operation of the lens device 100 along the X-axis.

However, the invention is not limited thereto. The second reflecting unit 1511 and the third reflecting unit 1512 are movable along the X-axis in the same direction or in opposite directions to change the light travel distance between the lens module 120 and the image sensing module 140 so as to perform the autofocus operation of the lens device 100 and to perform the optical image stabilization operation of the lens device 100 along the X-axis.

The autofocus operation of the invention is not limited to what is described above. In a substitute embodiment, the lens module further includes a driving element for driving the lens-unit carrier to move with respect to the lens-unit fixing seat along the X-axis in order to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the reflecting-unit carrier to rotate about the Z-axis in order to perform the optical image stabilization operation along the Y-axis. The lens module 100 may further include another driving element for driving the light-path turning module 150 to move with respect to the lens module 120 along the X-axis in order to perform the autofocus operation.

Figure 16:
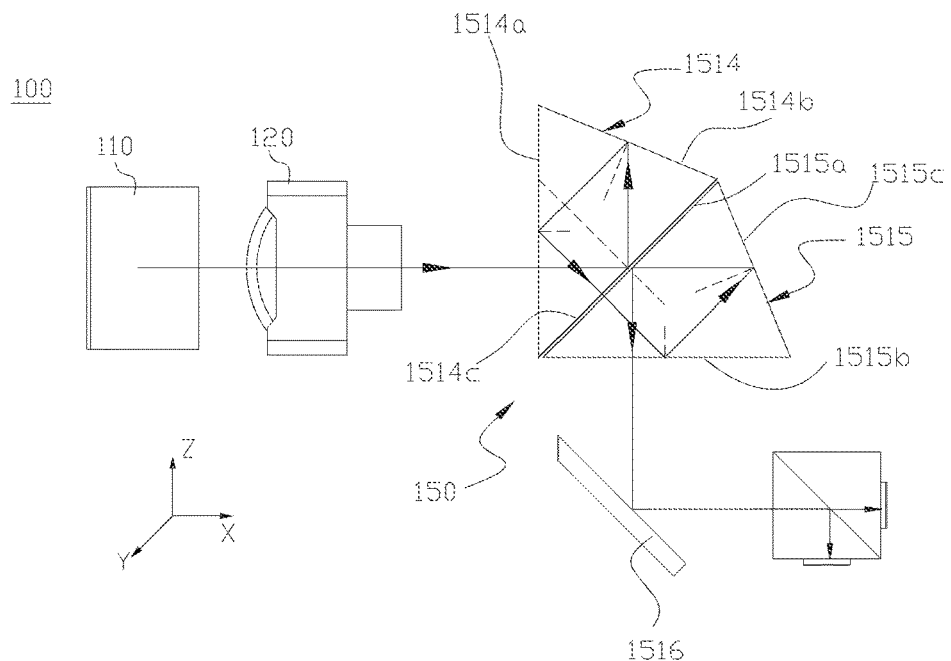
FIG. 16 is a schematic diagram of a lens device in accordance with the fifteenth embodiment of the invention.

FIG. 16 is a schematic diagram of a lens device in accordance with the fifteenth embodiment of the invention that is an embodiment modified from the eighth embodiment. For simplification, the parts same as or similar to those of the eighth embodiment are not described. As shown in FIG. 16, the lens device 100 includes a reflecting module 110, a lens module 120, a light-path turning module 150, a light splitting module 130 and an image sensor 140. The fifteenth embodiment differs from the eighth embodiment in the structure of the light-path turning module 150.

The light-path turning module 150 includes a first reflecting prism unit 1514, a second reflecting prism unit 1515 and a first reflecting unit 1516. The first reflecting prism unit 1514 may be a triangular prism that includes a first surface 1514a, a second surface 1514e and a third surface 1514b. The first surface 1514a is perpendicular to the X-axis. The second surface 1514c is disposed at 135° from the X-axis. The third surface 1514b may be at 30° from the X-axis. The first surface 1514a, the second surface 1514c and the third surface 1514b are arranged to form an acute triangle. In operation, the light coining from the lens module 120 enters the first surface 1514a, is reflected on the second surface 1514c, is reflected on the third surface 1514b back to the first surface 1514a, is totally reflected on the first surface 1514a, is perpendicularly incident on the second surface 1514c and penetrates the second surface 1514c.

The second reflecting prism unit 1515 may be a triangular prism that includes a fourth surface 1515a, a fifth surface 1515b and a sixth surface 1515c. The fourth surface 1515a is disposed to face the second surface 1514c. Further, the fourth surface 1515a and the second surface 1514c are attached to each other or have an air gap therebetween. The fifth surface 1515b may be parallel to the X-axis. In operation, the light penetrating the second surface 1514c is incident on the fourth surface 1515a, is totally reflected on the fifth surface 1515b, is reflected on the sixth surface 1515c and back to the fourth surface 1515a, is totally reflected on the fourth surface 1515a, is perpendicularly incident on the fifth surface 1515b and exits therefrom.

The first reflecting unit 1516 receives the light coming from the second reflecting prism unit 1515 and reflects the light to the light splitting module 130.

In this embodiment, the lens module further includes a driving element for driving the lens-unit carrier to move with respect to the lens-unit fixing seat along the X-axis in order to perform the autofocus operation.

In this embodiment, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the reflecting-unit carrier to rotate about the Z-axis in order to perform the optical image stabilization operation along the Y-axis.

Figure 17:
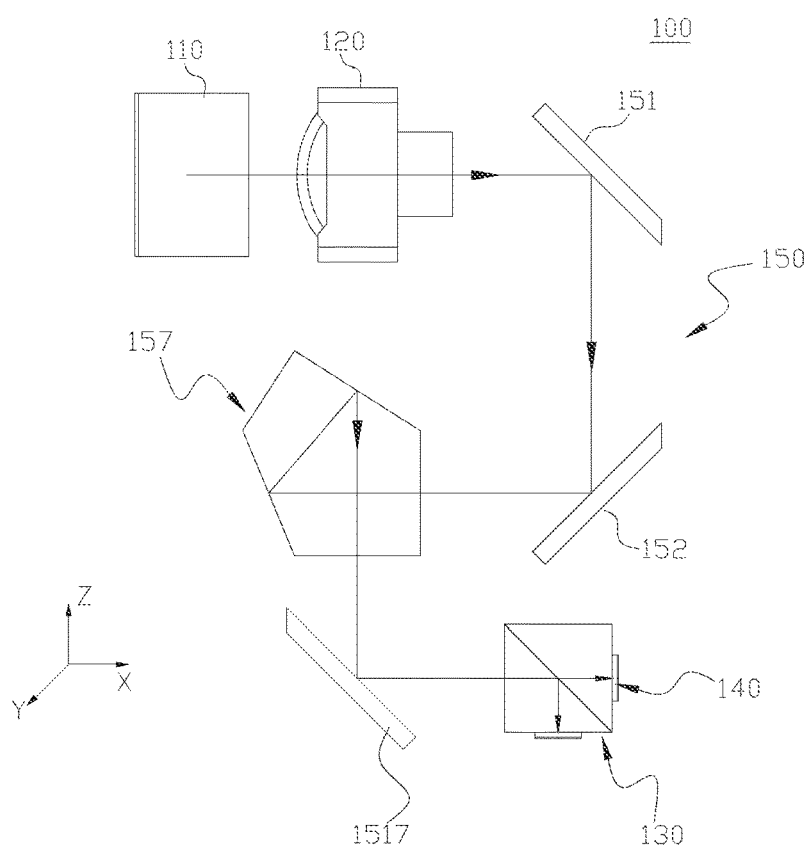
FIG. 17 is a schematic diagram of a lens device in accordance with the sixteenth embodiment of the invention.

FIG. 17 is a schematic diagram of a lens device in accordance with the sixteenth embodiment of the invention that is an embodiment modified from the tenth embodiment. For simplification, the parts same as or similar to those of the tenth embodiment are not described. As shown in FIG. 17, the lens device 100 includes a reflecting module 110, a lens module 120, a light-path turning module 150, a light splitting module 130 and an image sensor 140. The sixteenth embodiment differs from the tenth embodiment in the structure of the light-path turning module 150.

The light-path turning module 150 includes a first reflecting unit 151, a second reflecting unit 152, a reflecting prism unit 157 and a third reflecting unit 1517. Along the light path, the third reflecting unit 1517 is disposed after the reflecting prism unit 157 and before the light splitting module 130. That is, the third reflecting unit 157 is disposed between the reflecting prism unit 157 and the light splitting module 130. The locations and structures of the first reflecting unit 151, the second reflecting unit 152 and the reflecting prism unit 157 remain unchanged.

The third reflecting unit 1517 may be disposed at 45° from the X-axis for reflecting the light that exits from the reflecting prism surface 157 to the light splitting module 130. In this embodiment, therefore, the focal length and magnification for the optical zoom can be increased.

In this embodiment, the first reflecting unit 151 and the second reflecting unit 152 are movable along the Z-axis in the same direction or in opposite directions to change the light travel distance between the lens module 120 and the image sensing module 140 so as to perform the autofocus operation of the lens device 100 and to perform the optical image stabilization operation of the lens device 100 along the Z-axis.

The autofocus operation of the invention is not limited to what is described above. In a substitute embodiment, the lens module further includes a driving element for driving the lens-unit carrier to move with respect to the lens-unit fixing seat along the X-axis in order to perform the autofocus operation.

In the substitute embodiment mentioned above, the lens device can also perform optical image stabilization operation along the Y-axis and the Z-axis in several ways. However, the invention is not limited thereto.

For example, the reflecting-unit carrier is connected to the reflecting-unit fixing seat through a shaft extending along the Z-axis. The lens module 100 may include a driving element for driving the reflecting-unit carrier to rotate about the Z-axis in order to perform the optical image stabilization operation along the Y-axis. The lens module 100 may further include another driving element for driving the light-path turning module 150 to move with respect to the lens module 120 along the X-axis in order to perform the autofocus operation.

The invention utilizes the light splitting module to split the incident light into at least the first light beam and the second light beam and to correspondingly form images on the first-light-beam image sensing unit and the second-light-beam image sensing unit. Therefore, the invention can effectively increase the image-sensing area so as to sense the incident light beam as much as possible. Further, when the magnification of the long focal length of the lens module is rather large, the invention can compensate for the insufficient light amount to improve the quality of images.

It is noted that the light-path turning module 150 of the invention can be implemented in different forms and the application of the light-path turning module 150 is not limited to what is disclosed in a single embodiment described above. For example, with the locations and orientations of the light splitting modules 130 and the image sensing modules 140 adapted, the light-path turning modules 150 provided in the above embodiments in which the light is split into two light beams can be used as those provided in the above embodiments in which the light is split into three light beams, and vice versa. For simplification, the descriptions thereof are omitted.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A lens device, comprising:
   a lens module comprising an optical axis extended in a first direction;
   a light splitting module configured to split light coming from the lens module into at least a first light beam and a second light beam, wherein the first light beam and the second light beam have wavelengths of different ranges;
   an image sensing module comprising a plurality of image sensing units corresponding to the first light beam and the second light beam respectively, wherein the image sensing units are disposed at different sides of the light splitting module to sense the corresponding light beam;
   wherein the light splitting module comprises a first prism unit;

wherein the first prism unit comprises a second surface and a first light splitting film coated on the second surface.

2. The lens device as claimed in claim 1, wherein the image sensing units comprises a first-light-beam image sensing unit configured to sense the first light beam, and a second-light-beam image sensing unit configured to sense the second light beam.

3. The lens device as claimed in claim 2, further comprising a reflecting module wherein the light travels in a second direction to enter the lens device, and is reflected in the first direction to the lens module by the reflecting module.

4. The lens device as claimed in claim 2, wherein:
the light splitting module is configured to further split the light into a third light beam, the first light beam, the second light beam and the third light beam have wavelengths of different ranges, and the image sensing modules further comprises a third-light-beam image sensing unit to sense the third light beam;
the light splitting module further comprises a second prism unit disposed adjacent to the first prism unit;
the first prism unit further comprises a first surface allowing the light that enters the first prism unit to pass therethrough, and a third surface from which the first light beam exits;
the second surface reflects the first light beam and allows the second and third light beams to pass therethrough.

5. The lens device as claimed in claim 4, wherein the second prism unit comprises a fourth surface allowing the second and third light beams to pass therethrough, a fifth surface reflecting the second light beam and allowing the third light beam to pass therethrough, a second light splitting film coated on the fifth surface, and a sixth surface from which the second light beam exits, and the fourth surface and the second surface are disposed to face each other.

6. The lens device as claimed in claim 4, wherein the second prism unit is configured to turn the second light beam, the second-light-beam image sensing unit is configured to sense the second light beam and is disposed adjacent to the sixth surface, the second-light-beam image sensing unit and the first-light-beam image sensing unit are disposed at same side of the light splitting module, and the third-light-beam image sensing unit and the first-light-beam image sensing unit are disposed at different sides of the light splitting module.

7. The lens device as claimed in claim 4, wherein:
the light splitting module further comprises a third prism unit disposed adjacent to the second prism unit;
the third prism unit comprises a seventh surface allowing the third light beam to pass therethrough, and an eighth surface from which the third light beam exits, and the seventh surface is disposed adjacent to the fifth surface.

8. The lens device as claimed in claim 7, wherein the first light beam is reflected on the second surface to the first surface, is totally reflected on the first surface, and exits from the third surface, and the second light beam is reflected on the fifth surface to the fourth surface, is totally reflected on the fourth surface, and exits from the sixth surface.

9. The lens device as claimed in claim 8, wherein the first light splitting film coated on the second surface allows light of wavelength of 500 nm-700 nm to pass therethrough, and the second light splitting film coated on the fifth surface allows light of wavelength of 400 nm-600 nm to pass therethrough.

10. The lens device as claimed in claim 1, further comprising a reflecting module and a light-path turning module wherein the light travels in a second direction to enter the lens device, is reflected in the first direction to the lens module by the reflecting module, and the light-path turning module is disposed in a light path between the lens module and the light splitting module.

11. The lens device as claimed in claim 10, wherein:
the light-path turning module comprises a first reflecting unit, a second reflecting unit and a third reflecting unit, the first reflecting unit and the second reflecting unit are movable along an axis in same direction or in opposite directions, and the axis is perpendicular to the first direction and the second direction;
the first reflecting unit reflects the light exiting from the lens module to the second reflecting unit, the second reflecting unit reflects the light coming from the first reflecting unit to the third reflecting unit, and the third reflecting unit reflects the light coming from the second reflecting unit to the light splitting module.

12. The lens device as claimed in claim 10, wherein:
the light-path turning module comprises a first reflecting unit, a second reflecting unit, a reflecting prism unit and a third reflecting unit;
the first reflecting unit and the second reflecting unit are movable along an axis in same direction or in opposite directions, and the axis is perpendicular to the first direction and the second direction;
the first reflecting unit reflects the light exiting from the lens module to the second reflecting unit, the second reflecting unit reflects the light coming from the first reflecting unit to the reflecting prism unit;
the reflecting prism unit comprises a first prism incident surface allowing the light to penetrate, a first prism reflecting surface reflects the light that penetrates the first prism incident surface, a second prism reflecting surface receiving and reflecting the light reflected on the first prism reflecting surface, and a first prism exiting surface;
the third reflecting unit reflects the light exiting from the reflecting prism unit to the light splitting module, the third reflecting unit is disposed in the light path, after the reflecting prism unit and before the light splitting module.

13. The lens device as claimed in claim 10, wherein:
the light-path turning module comprises a first reflecting prism unit and a second reflecting prism unit;
the first reflecting prism unit and the second reflecting prism unit are both movable in a third direction, and the third direction is perpendicular to the first direction and the second direction;
the first reflecting prism unit comprises a first prism incident surface allowing the light to penetrate, a first prism reflecting surface reflects the light that penetrates the first prism incident surface, a second prism reflecting surface receiving and reflecting the light that is reflected on the first prism reflecting surface, and a first prism exiting surface;
the second reflecting prism unit comprises a second prism incident surface receiving the light that comes from the first reflecting prism unit, a third prism reflecting surface reflects the light, a fourth prism reflecting surface receiving and reflecting the light that is reflected on the third prism reflecting surface, and a second prism exiting surface disposed adjacent to the light splitting module.

14. The lens device as claimed in claim 10, wherein:
the light-path turning module comprises a first reflecting unit, a second reflecting unit, a third reflecting unit and a fourth reflecting unit;
the first reflecting unit comprises a first front reflecting surface and a first rear reflecting surface wherein the first front reflecting surface and the first rear reflecting surface are opposite surfaces of the first reflecting unit, and the first front reflecting surface is configured to reflect the light exiting from the lens module to the second reflecting unit;
the second reflecting unit is configured to reflect the light coming from the first reflecting surface to the third reflecting unit, the third reflecting unit is configured to reflect the light coming from the second reflecting unit to the fourth reflecting unit, the fourth reflecting unit is configured to reflect the light coming from the third reflecting unit to the first rear reflecting surface, the first rear reflecting surface is configured to reflect the light to the light splitting module.

15. The lens device as claimed in claim 10, wherein:
the light-path turning module comprises a first reflecting prism unit, a second reflecting prism unit and a first reflecting unit;
the first reflecting prism unit comprises a first surface, a second surface and a third surface, the light coming from the lens module penetrates the first surface, is reflected on the second surface to the third surface, is reflected on the third surface back to the first surface, is totally reflected on the first surface and perpendicularly penetrates the second surface;
the second reflecting prism unit comprises a fourth surface, a fifth surface and a sixth surface;
the fourth surface and the second surface face each other, the light coming from the second surface penetrates the fourth surface, is totally reflected on the fifth surface to the sixth surface, is reflected on the sixth surface back to the fourth surface, is totally reflected on the fourth surface and perpendicularly penetrates the fifth surface;
the first reflecting unit receives the light from the second reflecting prism unit and reflects the light to the light splitting module.

16. A lens device, comprising:
a lens module comprising an optical axis extended in a first direction;
a light splitting module configured to split light coming from the lens module into at least a first light beam and a second light beam, wherein the first light beam and the second light beam have wavelengths of different ranges;
an image sensing module comprising a plurality of image sensing units corresponding to the first light beam and the second light beam respectively, wherein the image sensing units are disposed at different sides of the light splitting module to sense the corresponding light beam;
a reflecting module;
a light-path turning module;
wherein the light-path turning module comprises a first reflecting unit and a second reflecting unit movable along an axis in same direction or in opposite directions.

17. The lens device as claimed in claim 16, wherein:
the image sensing units comprises a first-light-beam image sensing unit configured to sense the first light beam, and a second-light-beam image sensing unit configured to sense the second light beam;
the first reflecting unit comprises a first reflecting surface to reflect the light exiting from the lens module to the second reflecting unit, the second reflecting unit comprises a second reflecting surface to reflect the light exiting from the first reflecting surface to the light splitting module, and the axis is perpendicular to the first direction and a second direction.

18. The lens device as claimed in claim 17, wherein:
the light splitting module comprises a light incident surface through which the light enters the light splitting module, a light splitting surface allowing the first light beam to pass therethrough and reflecting the second light beam, a first exiting surface from which the first light beam exits, and a second exiting surface from which the second light beam exits;
the image sensing module comprises a first image sensing unit disposed adjacent to the first exiting surface, a second image sensing unit disposed adjacent to the second exiting surface, a first optical filter disposed between the first image sensing unit and the first exiting surface, and a second optical filter disposed between the second image sensing unit and the second exiting surface.

19. A lens device, comprising:
a lens module comprising an optical axis extended in a first direction;
a light splitting module configured to split light coming from the lens module into at least a first light beam and a second light beam, wherein the first light beam and the second light beam have wavelengths of different ranges;
an image sensing module comprising a plurality of image sensing units corresponding to the first light beam and the second light beam respectively, wherein the image sensing units are disposed at different sides of the light splitting module to sense the corresponding light beam;
a reflecting module;
a light-path turning module;
wherein the light travels in a second direction to enter the lens device, and is reflected in the first direction to the lens module by the reflecting module;
wherein the light-path turning module comprises:
a first reflecting unit configured to reflect the light coming from the lens module;
a reflecting prism unit that is movable in a third direction to reflect the light coming from the first reflecting unit, wherein the third direction is perpendicular to the first and second directions;
a second reflecting unit configured to reflect the light coming from the reflecting prism unit.

20. The lens device as claimed in claim 19, wherein the reflecting prism unit comprises a first-prism-unit surface and a second-prism-unit surface, the first-prism-unit surface is configured to reflect the light entering the reflecting prism unit to the second-prism-unit surface, the second-prism-unit surface is configured to reflect the light coming from the first-prism-unit surface to the second reflecting unit, the image sensing module further comprises a first optical filter and a second optical filter, and the first optical filter allows light of wavelength of 400 nm-600 nm to pass therethrough, and the second optical filter allows light of wavelength of 500 nm-700 nm to pass therethrough.

* * * * *